United States Patent [19]

Inagaki et al.

[11] Patent Number: 5,726,832
[45] Date of Patent: Mar. 10, 1998

[54] INFORMATION RECORDING/ REPRODUCING DEVICE INCLUDING A HEAD LOADING/UNLOADING MECHANISM HAVING DECOUPLING MEANS

[75] Inventors: Tatsuhiko Inagaki, Takatsuki; Kiyoshi Masaki, Amagasaki; Yuji Yagi, Neyagawa; Michiro Tanaka, Ikoma, all of Japan

[73] Assignee: Matsushita Electric Industrial Co., Ltd., Kadoma, Japan

[21] Appl. No.: 586,419

[22] Filed: Jan. 16, 1996

Related U.S. Application Data

[63] Continuation of Ser. No. 180,037, Jan. 11, 1994, abandoned.

[30] Foreign Application Priority Data

| Jan. 13, 1993 | [JP] | Japan | 5-003777 |
| Sep. 7, 1993 | [JP] | Japan | 5-221609 |
| Nov. 18, 1993 | [JP] | Japan | 5-289011 |

[51] Int. Cl.$^6$ ................................. G11B 21/02
[52] U.S. Cl. ................................. 360/105
[58] Field of Search ................ 360/105–106; 369/77.2, 77.1, 198, 199

[56] References Cited

U.S. PATENT DOCUMENTS

| 4,504,879 | 3/1985 | Toldi et al. | 360/105 |
| 4,723,185 | 2/1988 | Maeda | 360/97 |
| 4,993,009 | 2/1991 | Shiho | 369/13 |
| 4,999,725 | 3/1991 | Takahashi | 360/105 |
| 5,070,423 | 12/1991 | Gloski | 360/106 |
| 5,107,484 | 4/1992 | Kawamura et al. | 369/77.2 |
| 5,130,869 | 7/1992 | Kikuya et al. | 360/99.06 |
| 5,134,532 | 7/1992 | Svendsen et al. | 360/106 |
| 5,136,571 | 8/1992 | Nakajima | 369/77.2 |
| 5,193,080 | 3/1993 | Mohri et al. | 369/244 |
| 5,204,793 | 4/1993 | Plonczak | 360/105 |
| 5,291,361 | 3/1994 | Yokota | 360/105 |
| 5,309,421 | 5/1994 | Fujisawa | 369/77.2 |
| 5,313,351 | 5/1994 | Lee | 369/77.2 |

FOREIGN PATENT DOCUMENTS

| 0108500 | 5/1984 | European Pat. Off. | 360/105 |
| 0349279 | 1/1990 | European Pat. Off. | |
| 0351191 | 1/1990 | European Pat. Off. | |
| 0482585 | 4/1992 | European Pat. Off. | |
| 240179 | 2/1990 | Japan . | |
| 461672 | 2/1992 | Japan . | |
| 466066 | 10/1992 | Japan . | |
| 4345977 | 12/1992 | Japan . | |
| 5307850 | 11/1993 | Japan . | |
| 2192750 | 1/1988 | United Kingdom . | |

*Primary Examiner*—Stuart S. Levy
*Assistant Examiner*—Brian E. Miller
*Attorney, Agent, or Firm*—Renner, Otto, Boisselle, Sklar

[57] ABSTRACT

An information recording/reproducing apparatus removably holding a disk cartridge including a case having a head window and a recording medium stored in the case is provided. The apparatus includes: a rotation mechanism; a cartridge loading mechanism for transporting the disk cartridge from a first unloading position to a first recording/ reproducing position when the disk cartridge is mounted, and for transporting the disk cartridge from the first recording/reproducing position to the first unloading position when the disk cartridge is removed; and a head loading mechanism for transporting the head from a second unloading position to a second recording/reproducing position after the disk cartridge has been placed at the first recording/ reproducing position when the disk cartridge is mounted, and for transporting the head from the second recording/ reproducing position to the second unloading position before the disk cartridge is transported from the first recording/ reproducing position to the first unloading position when the disk cartridge is removed. The second unloading position is set outside the periphery of the disk cartridge at the first recording/reproducing position.

6 Claims, 20 Drawing Sheets

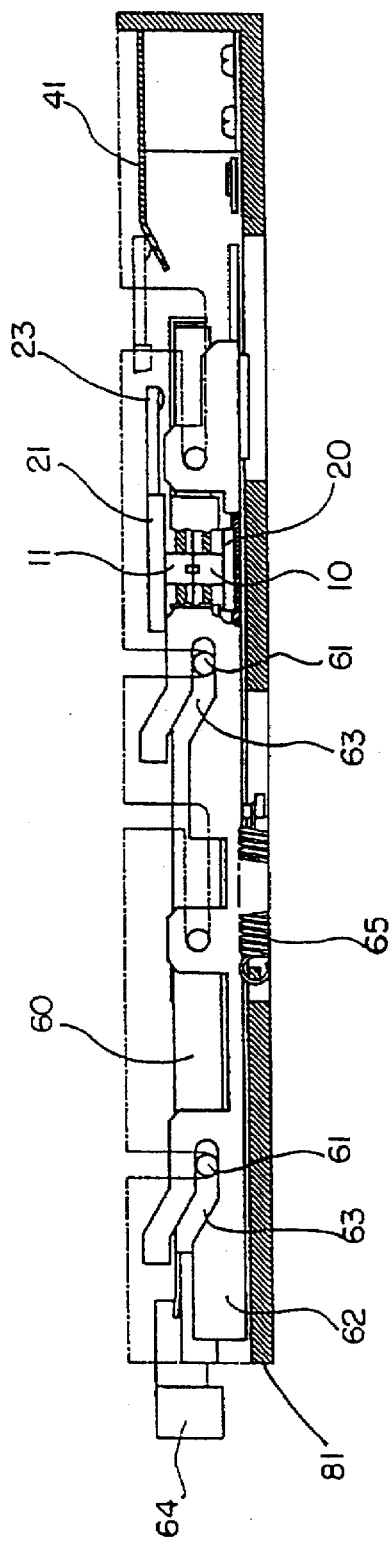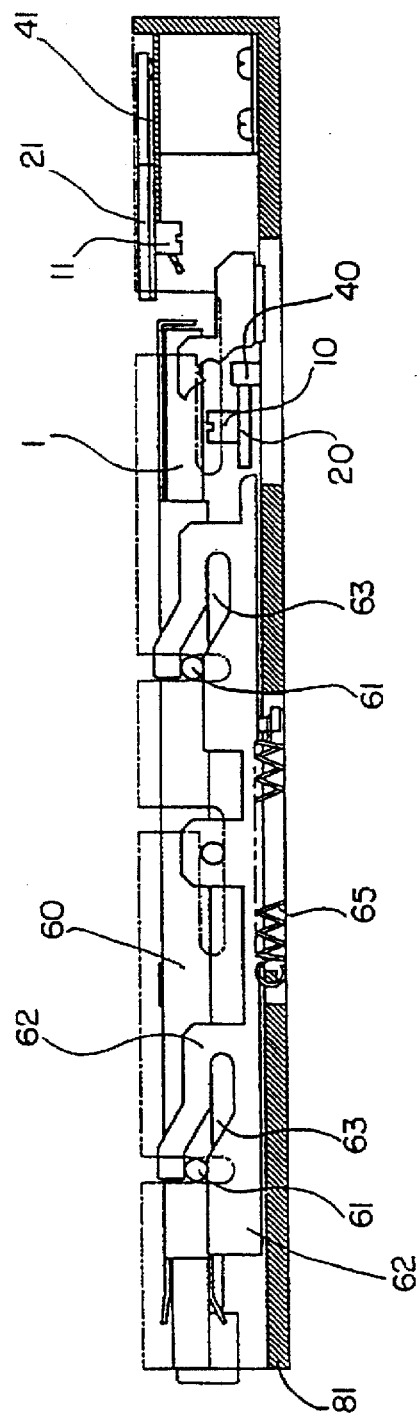

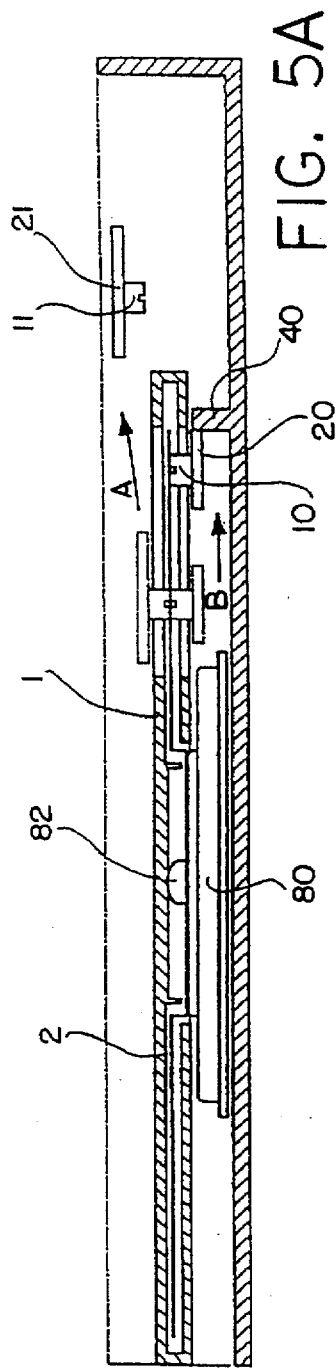
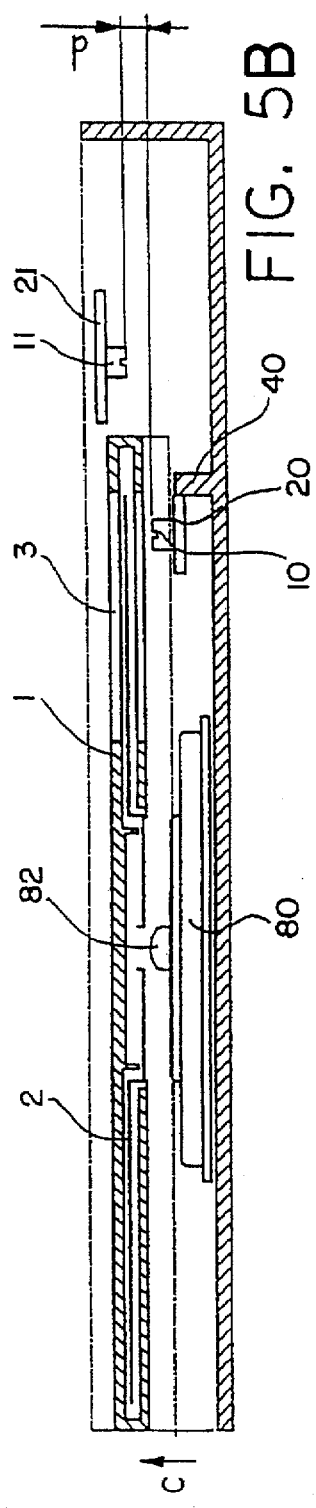
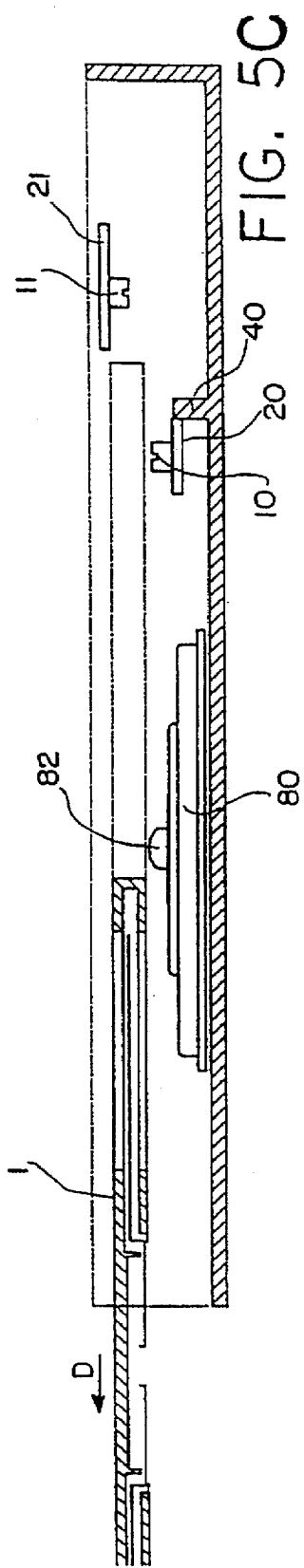

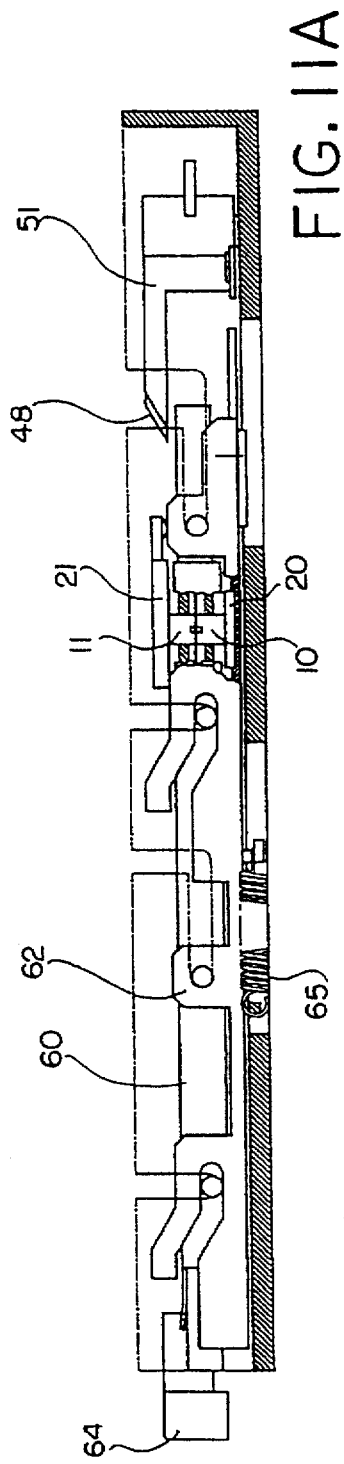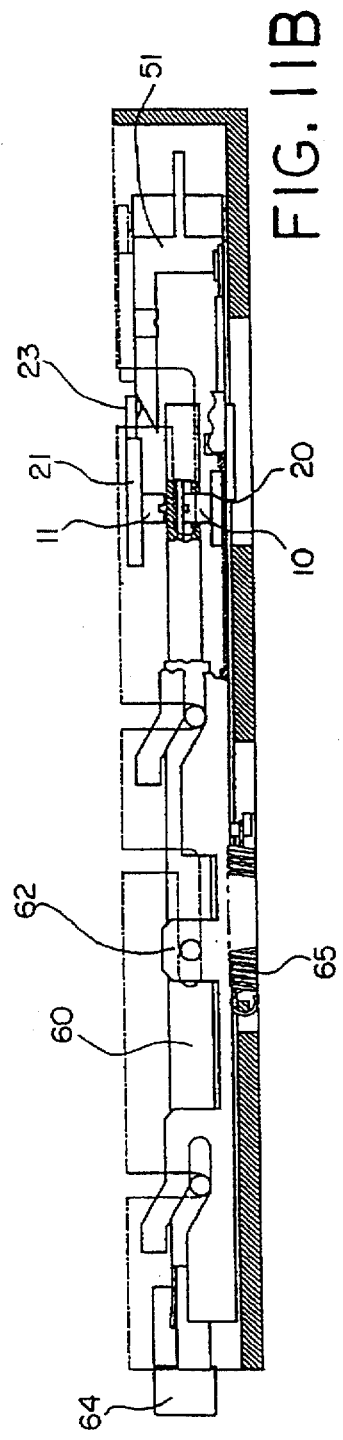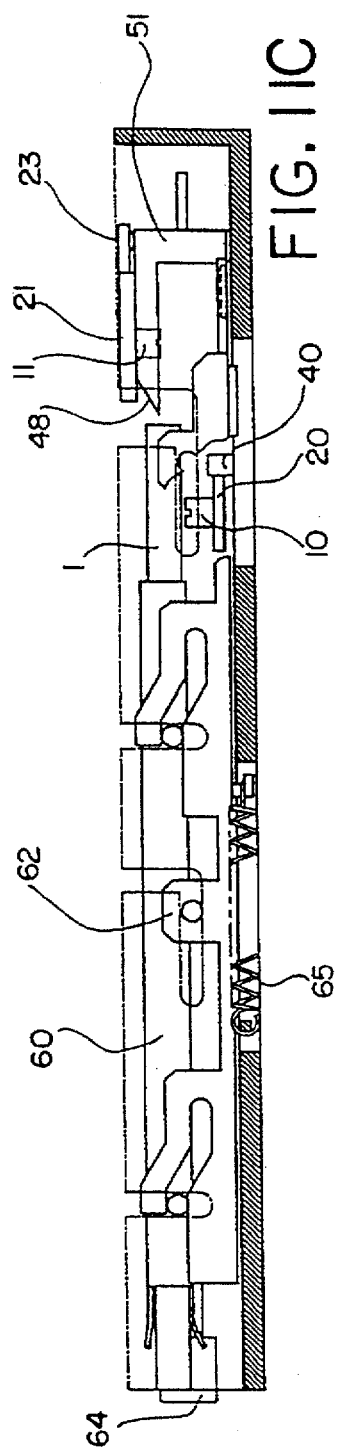

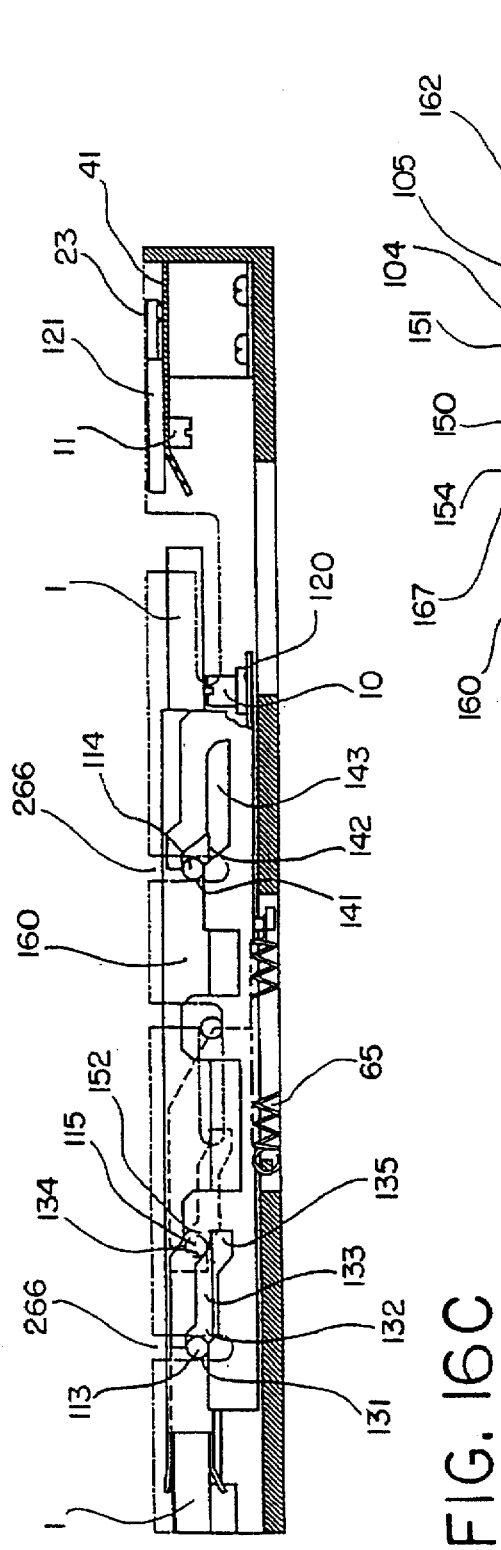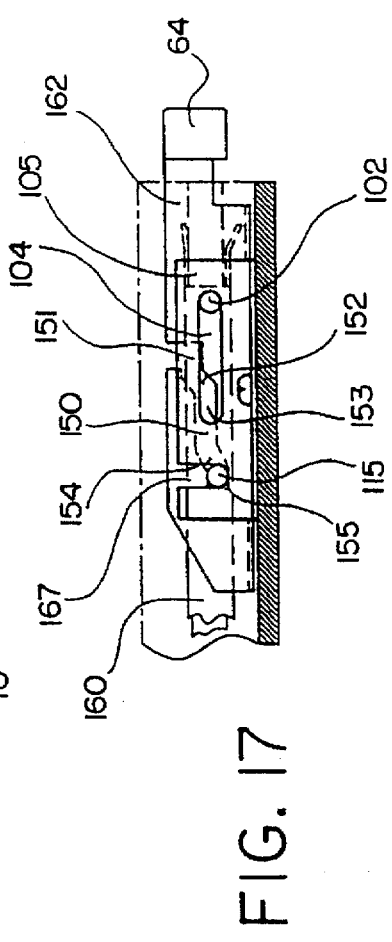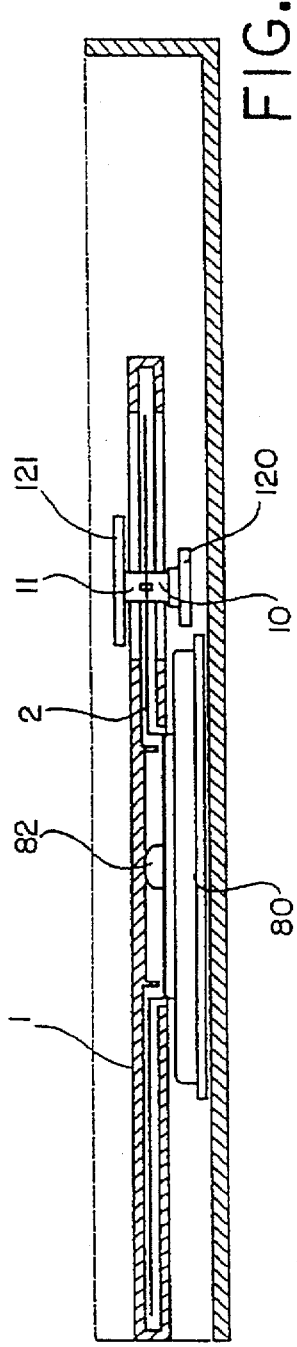

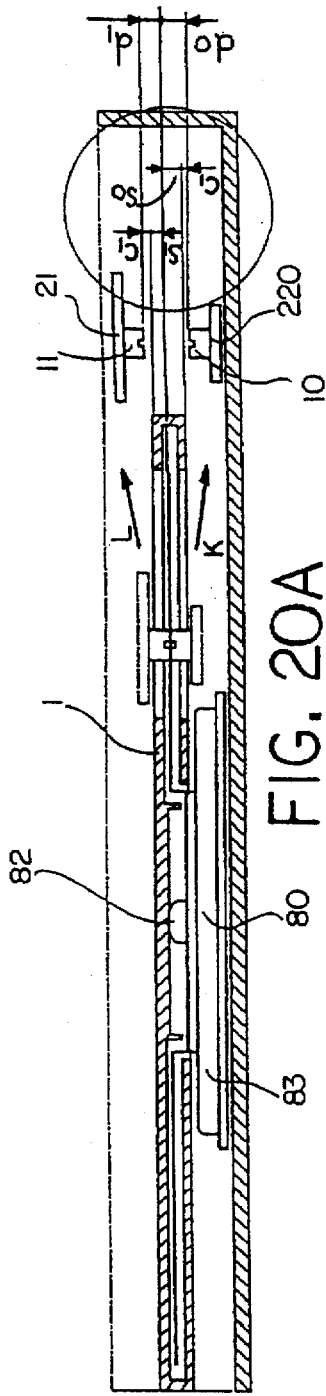

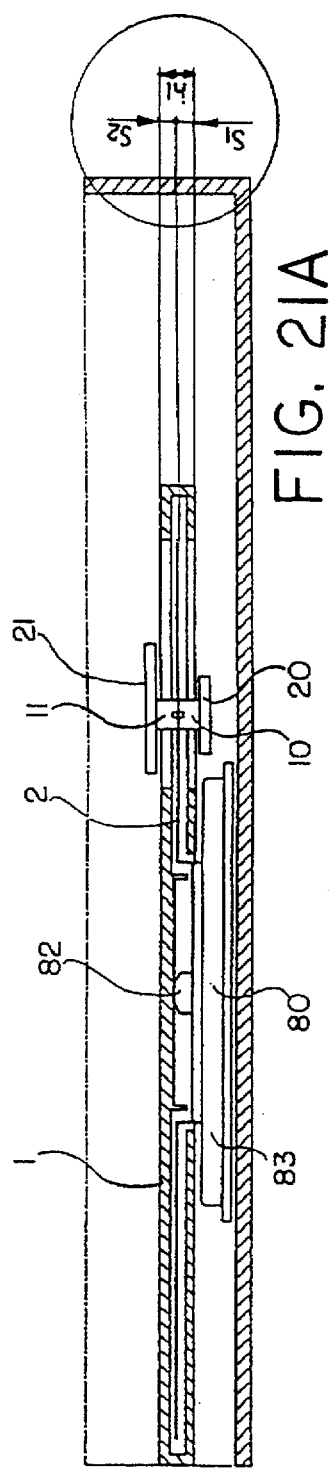
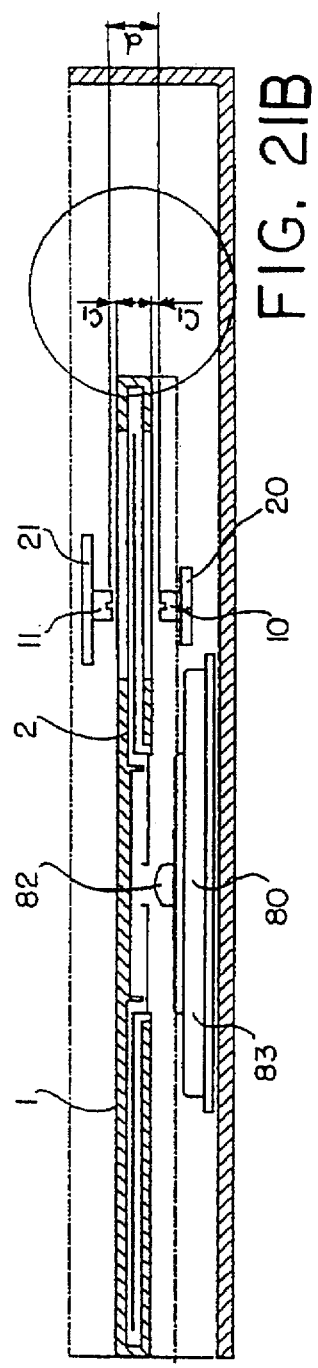
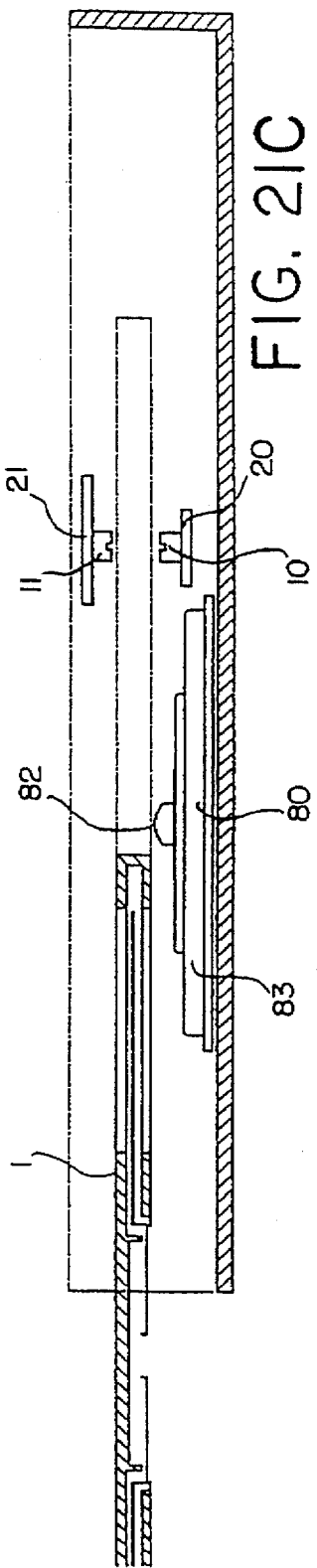

INFORMATION RECORDING/ REPRODUCING DEVICE INCLUDING A HEAD LOADING/UNLOADING MECHANISM HAVING DECOUPLING MEANS

This application is a continuation of application Ser. No. 08/180,037 filed on Jan. 11, 1994 now abandoned.

BACKGROUND OF THE INVENTION

1. Field of the Invention

The present invention relates to an information recording/reproducing apparatus using a disk cartridge for a disk such as a flexible disk and an optical disk.

2. Description of the Related Art

An information recording/reproducing apparatus for using a replaceable disk cartridge for a disk such as a flexible disk and an optical disk has been widely used as a disk unit for personal computers. A flexible disk unit for receiving a flexible disk is popular because it is easily handled and is less expensive. Especially, with the recent advent of small and thin personal computers such as a notebook type computer and a handheld computer, a small and thin flexible disk unit capable of being incorporated in such a computer is required.

In a flexible disk unit for receiving a "90 mm flexible disk cartridge" as standardized by JIS (Japanese Industrial Standard), information is recorded on, or reproduced from a recording medium in the cartridge by inserting the head of the disk unit into the cartridge through a head window of the cartridge so that the head is in contact with the recording medium. Therefore, when the cartridge is removed from the disk unit, the head should be pulled back from the cartridge through the head window. In other words, during the removal/mounting of the cartridge from/into the disk unit, the head needs to retreat to a position where it will not block the movement of the cartridge so as to secure a passage for the cartridge.

Since space is required to secure the passage for the cartridge, it is difficult to reduce the thickness of the disk unit. Japanese Laid-Open Patent Publication No. 2-40179 and No. 4-61672, for example, propose methods for making the disk unit thinner by minimizing the space for the head to retreat. These methods, however, at the mounting/removal of the cartridge, require at least one head of the disk unit to be moved vertically away from the cartridge by a distance equal to, or more than the thickness of the cartridge.

FIGS. 21A to 21C schematically show the removal of the cartridge in a conventional information recording/reproducing apparatus. A cartridge 1 having a recording medium 2 therein is mounted in an information recording/reproducing apparatus including a side 0 head 10 fixed to a side 0 arm 20, a side 1 head 11 fixed to a side 1 arm 21, a spindle motor 80, a spindle shaft 82, and a rotor of the spindle motor 80. As shown in FIG. 21A, during the recording/reproducing operation, the side 0 head 10 and the side 1 head 11 are in contact with the recording medium 2. As shown in FIG. 21B, when the cartridge 1 is to be removed, bosh the side 1 head 11 and the cartridge 1 are lifted up. At this time, the side 1 head 10 is lifted by a distance equal to or more than the thickness of the cartridge 1. Then, as shown in FIG. 21C, the cartridge is ejected from the apparatus by use of an appropriate means.

As shown in FIG. 21A, the thickness h1 of the cartridge 1 is standardized at a maximum of 3.5 mm. When the heads 10 and 11 have a thickness h2 of 2.1 mm, the thickness s1 of a portion of the side 0 head 10 which is placed inside the cartridge 1 during the recording/reproducing operation is normally approximately 1.8 mm, and the thickness s2 of the portion of the side 1 head 11 which is placed inside the cartridge 1 during the recording/reproducing operation is normally approximately 1.7 mm. In order to prevent the cartridge 1 from hitting against the heads 10 and 11 when it is ejected from the apparatus, clearances c1 are normally provided between the cartridge 1 and the side 0 head 10 and between the cartridge 1 and the side 1 head 11. Such clearances c1 are 0.5 mm in this case. The lift of the cartridge 1 is then obtained by calculating:

$$s1+c1=1.8+0.5=2.3 \text{ mm}.$$

This indicates that the cartridge 1 should be lifted by a distance equal to or more than the thickness of the head.

Normally, the thickness of a portion of the spindle shaft 82 which is placed inside the cartridge 1 during the recording/reproducing operation is approximately 2.1 mm so that the center of the rotation of the recording medium 2 can be fixed with high precision. Accordingly, by lifting the cartridge 1 by the distance shown tin the calculation, i.e., 2.3 mm, the bottom surface of the cartridge 1 will sufficiently clear the top end of the spindle shaft 82.

The side 1 head 11 needs to be lifted greater than the cartridge 1. It is considered that the lift of the side 1 head 11 is substantially equal to the distance d between the two heads 10 and 11 (the distance between the top surface of the side 0 head 10 and the bottom surface of the side 1 head 11) positioned during the mounting/removal of the cartridge, since the thickness of the recording medium 2 is only 0.1 mm or less which is negligible. The distance d is at least the total of the thickness of the cartridge 1 and the upper and lower clearances, calculated as follows:

$$d=h1+c1\times 2=0.5\times 2=4.5 \text{ mm}.$$

According to the above-described conventional information recording/reproducing apparatus, when the cartridge is removed from the apparatus, at least one head needs to be moved vertically by a distance equal to or more than the thickness of the cartridge from the position placed during the information recording/reproducing operation (hereinafter, the position is referred to as the recording/reproducing position). This makes it difficult to make the apparatus thinner.

More specifically, when the cartridge is removed, the cartridge and the two heads need to be aligned vertically with minimum clearances among them. Accordingly, the distance d should be equal to or more than the thickness of the cartridge. In other words, the side 1 head needs to be lifted by at least a distance equal to the thickness of the cartridge. Thus, the minimum thickness of the resultant apparatus is the total of the thickness from the bottom surface of the apparatus to the top surface of the side 1 arm and the lift of the side 1 head, i.e., the thickness of the cartridge.

For example, assume that, during the information recording/reproducing operation, the thickness from the bottom surface of the apparatus to the top surface of the rotor is 2.8 mm, the clearance between the top surface of the rotor and the bottom surface of the cartridge is 0.7 mm, the thickness of the cartridge is 3.5 mm, the clearance between the side 1 arm and the top surface of the cartridge is 0.4 mm, and the thickness of the side 1 arm is 0.5 mm. Then, the thickness of the portion of the apparatus from the bottom surface thereof to the top surface of the side 1 arm is the total of the above figures, i.e., 7.9 mm.

The minimum thickness of the entire apparatus is then calculated by adding 3.5 mm, the thickness of the cartridge to the above 7.9 mm, to obtain 11.3 mm. In practice, the thickness is approximately 12.7 mm since the thickness of a cover, 0.3 mm and each clearance between each head and the cartridge, 0.5 mm are also added.

Since the thickness of the cartridge cannot be reduced, the only way to further reduce the thickness of the above conventional apparatus is to reduce the thickness of the portion of the apparatus from the bottom surface thereof to the top surface of the side 1 arm. That is, the clearances among the components and the thicknesses of the spindle motor, the arms, and the apparatus body may be reduced. Reducing the clearances may result in a decrease in the reliability of the apparatus. Therefore, in order to keep the level of the reliability, high precision is required for the size of each component as well as for the assembly thereof. Reducing the thickness of the spindle motor is also a problem. The spindle motor needs to generate a sufficiently large torque so that the recording medium can start rotating instantaneously and continue the rotation stably with high precision. In order to achieve this and also to reduce the thickness, an expensive rare earth magnet and a coil of a special shape are conventionally used for the spindle motor, resulting in an increase in the production cost. A more expensive component will be required to reduce the thickness of the spindle motor by only 1 mm. Reducing the thicknesses of the arms and the apparatus body degrades the vibration resistance and the shock resistance of the apparatus. Whichever method is adopted, thinning the conventional information recording/reproducing apparatus results in a cost increase and a deterioration of the performance of the resultant apparatus.

SUMMARY OF THE INVENTION

The information recording/reproducing apparatus of this invention removably holds a disk cartridge including a case having a head window and a recording medium stored in the case, for recording/reproducing information on/from at least one surface of the recording medium by inserting a head into the disk cartridge through the head window and retaining the head inside the disk cartridge, the apparatus including: a rotation mechanism for rotating the recording medium on the center axis thereof; a cartridge loading mechanism for transporting the disk cartridge from a first unloading position to a first recording/reproducing position to place the disk cartridge at the first recording/reproducing position when the disk cartridge is mounted, and for transporting the disk cartridge from the first recording/reproducing position to the first unloading position to place the disk cartridge at the first unloading position when the disk cartridge is removed; and a head loading mechanism for transporting the head from a second unloading position to a second recording/reproducing position to place the head at the second recording/reproducing position after the disk cartridge has been placed at the first recording/reproducing position when the disk cartridge is mounted, and for transporting the head from the second recording/reproducing position to the second unloading position to place the head at the second unloading position before the disk cartridge is transported from the first recording/reproducing position to the first unloading position when the disk cartridge is removed, wherein the second unloading position for the head is set outside the periphery of the disk cartridge placed at the first recording/reproducing position.

In one embodiment of the present invention, the head loading mechanism includes an actuator for the head seek.

In another embodiment of the present invention, the head loading mechanism is driven in association with the cartridge loading mechanism by a force for driving the cartridge loading mechanism.

In another embodiment of the present invention, the apparatus further includes a translationally movable driving member, wherein the cartridge loading mechanism places the disk cartridge at a position corresponding to the position of the driving member, and the head loading mechanism places the head at a position corresponding to the position of the driving member.

In another embodiment of the present invention, an operating button is disposed on the driving member for operating the removal of the disk cartridge.

In another embodiment of the present invention, the driving member has a first rack, the apparatus further comprises a translationally movable driving plate having a second rack, a train of gears including a first-stage gear engaging with the first rack of the driving member and a final-stage gear engaging with the second rack, and a head arm having the head fixed thereto, and the driving plate and the head arm are moved together for a predetermined limited portion of the entire range where the driving plate is movable.

In another embodiment of the present invention, the head loading mechanism includes a head arm having the head fixed thereto, and a cam engaging with the head arm for guiding the head along a passage between the second recording/reproducing position and the second unloading position.

In another embodiment of the present invention, the cam is movable between a retreat position located outside the periphery of the disk cartridge placed at the first recording/reproducing position and an advanced position located inside the periphery of the disk cartridge placed at the first recording/reproducing position.

In another embodiment of the present invention, the cartridge loading mechanism includes displacement means for transporting the disk cartridge in the direction where the rim of the head window will be away from the head when the head is moved into and out of the disk cartridge through the head window by the head loading mechanism.

In another embodiment of the present invention, the head loading mechanism places the head at the second recording/reproducing position in synchronization with the start of the rotation mechanism and places the head at the second unloading position in synchronization with the termination of the rotation mechanism.

In another embodiment of the present invention, the head loading mechanism includes an operating button for operating the removal of the disk cartridge and detection means for detecting whether the operating button has been operated.

In another embodiment of the present invention, the apparatus further includes a lock mechanism for holding the disk cartridge at the first recording/reproducing position by blocking the operation of the cartridge loading mechanism until the head has been placed at the second unloading position.

In another embodiment of the present invention, the head loading mechanism places the head at the second recording/reproducing position after the rotation mechanism is started.

Alternatively, there is provided an information recording/reproducing apparatus removably holding a disk cartridge including a case having a head window and a recording medium stored in the case, for recording/reproducing information on/from at least one surface of the recording medium by inserting a side 0 head and a side 1 head into the disk cartridge through the head window and retaining the side 0 head and the side 1 head inside the disk cartridge. The apparatus includes: a rotation mechanism for rotating the recording medium on the center axis thereof; a cartridge loading mechanism for transporting the disk cartridge from a first unloading position to a first recording/reproducing position so as to place the disk cartridge at the first recording/reproducing position when the disk cartridge is mounted, and for transporting the disk cartridge from the first recording/reproducing position to the first unloading position so as to place the disk cartridge at the first unloading position when the disk cartridge is removed; and a head loading mechanism for transporting the side 0 head and the side 1 head from a second unloading position to a second recording/reproducing position to place the side 0 head and the side 1 head at the second recording/reproducing position after the disk cartridge has been placed at the first recording/reproducing position when the disk cartridge is mounted, and for transporting the side 0 head and the side 1 head from the second recording/reproducing position to the second unloading position to place the side 0 head and the side 1 head at the second unloading position before the disk cartridge is transported from the first recording/reproducing position to the first unloading position when the disk cartridge is removed, wherein the second unloading position for the side 1 head is set outside the periphery of the disk cartridge placed at the first recording/reproducing position, and the head loading mechanism includes displacement means for allowing the side 1 head to override the rim of the head window when the head loading mechanism transports the side 1 head between the second recording/reproducing position and the second unloading position.

In one embodiment of the present invention, the side 0 head and the side 1 head are coupled with each other by coupling means, and the head loading mechanism includes driving means for directly driving one of the side 0 head and the side 1 head and means for discontinuing the coupling between the side 0 head and the side 1 head by applying a force of a predetermined level or more to the other of the side 0 head and the side 1 head which is not driven by the driving means.

In one embodiment of the present invention, the coupling means is a magnet.

In one embodiment of the present invention, the displacement means has a member extending from the second unloading position toward the second recording/reproducing position.

In one embodiment of the present invention, the member of the displacement means is rotatably supported and rotates so as to extend from the second unloading position toward the second recording/reproducing position.

The information recording/reproducing apparatus of the present invention uses a disk cartridge which includes a case having a head window and a recording medium stored in the case. The disk cartridge is removably held by the apparatus. A head of the apparatus is inserted into the case through the head window to reach the recording medium, so as to record/reproduce information on/from at least one surface of the recording medium. The apparatus includes a rotation mechanism for rotating the recording medium, a cartridge loading mechanism for selectively retaining the cartridge at the recording/reproducing position or at its unloading position where the removal of the cartridge is possible, and a head loading mechanism for selectively retaining the head at the recording/reproducing position or at its unloading position. The unloading position for the head is set outside the periphery of the cartridge.

According to the apparatus having the above-described components, the thickness of the apparatus can be reduced by reducing the vertical displacement of the head required for the mounting/removal of the cartridge. More specifically, according to the present invention, one head of the apparatus retreats outside the periphery of the cartridge while the cartridge is retained at the recording/reproducing position. Therefore, the vertical displacement for the retreat can be reduced by the equivalent of the subsequent lift of the cartridge, as compared with the conventional apparatus. Normally, the minimum thickness of the apparatus is the total of the thickness of the portion of the apparatus from the bottom surface thereof to the top surface of the side 1 head arm and the lift of the side 1 head. Since the lift of the side 1 head can be reduced as described above, the entire thickness of the apparatus can be reduced without reducing the thickness of the portion of the apparatus from the bottom surface thereof to the top surface of the side 1 arm at the recording/reproducing position. Since the lift of the cartridge is greater than the thickness of one head in the conventional apparatus, the apparatus of the present invention can be made thinner by at least the equivalent to the thickness of one head even when using the components of the same thicknesses as those in the conventional apparatus.

Thus, the invention described herein makes possible the advantage of providing an information recording/reproducing apparatus which can be made thinner without increasing production cost and without lowering the performance of the apparatus.

These and other advantages of the present invention will become apparent to those skilled in the art upon reading and understanding the following detailed description with reference to the accompanying figures.

BRIEF DESCRIPTION OF THE DRAWINGS

FIG. 3 is a side view of the first example, showing the positions during the recording/reproducing operation.

FIG. 4 is a side view of the first example, showing the positions after the unloading operation.

FIGS. 5A to 5C schematically show the removal of a cartridge from the apparatus of the first example.

FIGS. 11A to 11C are side views of the second example, showing the positions during the recording/reproducing operation, under the unloading operation, and after the unloading operation, respectively.

FIGS. 16A to 16C are side views of the right side wall of the third example as is seen from the insertion opening thereof, showing the positions during the recording/reproducing operation, under the unloading operation, and after the unloading operation, respectively.

FIG. 17 is a side view of the left side of the third example as is seen from the insertion opening thereof, showing the positions during the recording/reproducing operation.

FIGS. 18A to 18D schematically show the removal of a cartridge from the apparatus of the third example.

FIGS. 20A to 20C schematically show the removal of a cartridge from the apparatus of the fourth example.

FIGS. 21A to 21C schematically show the removal of a cartridge from a conventional information recording/reproducing apparatus.

DESCRIPTION OF THE PREFERRED EMBODIMENTS

EXAMPLE 1

Figure 1:
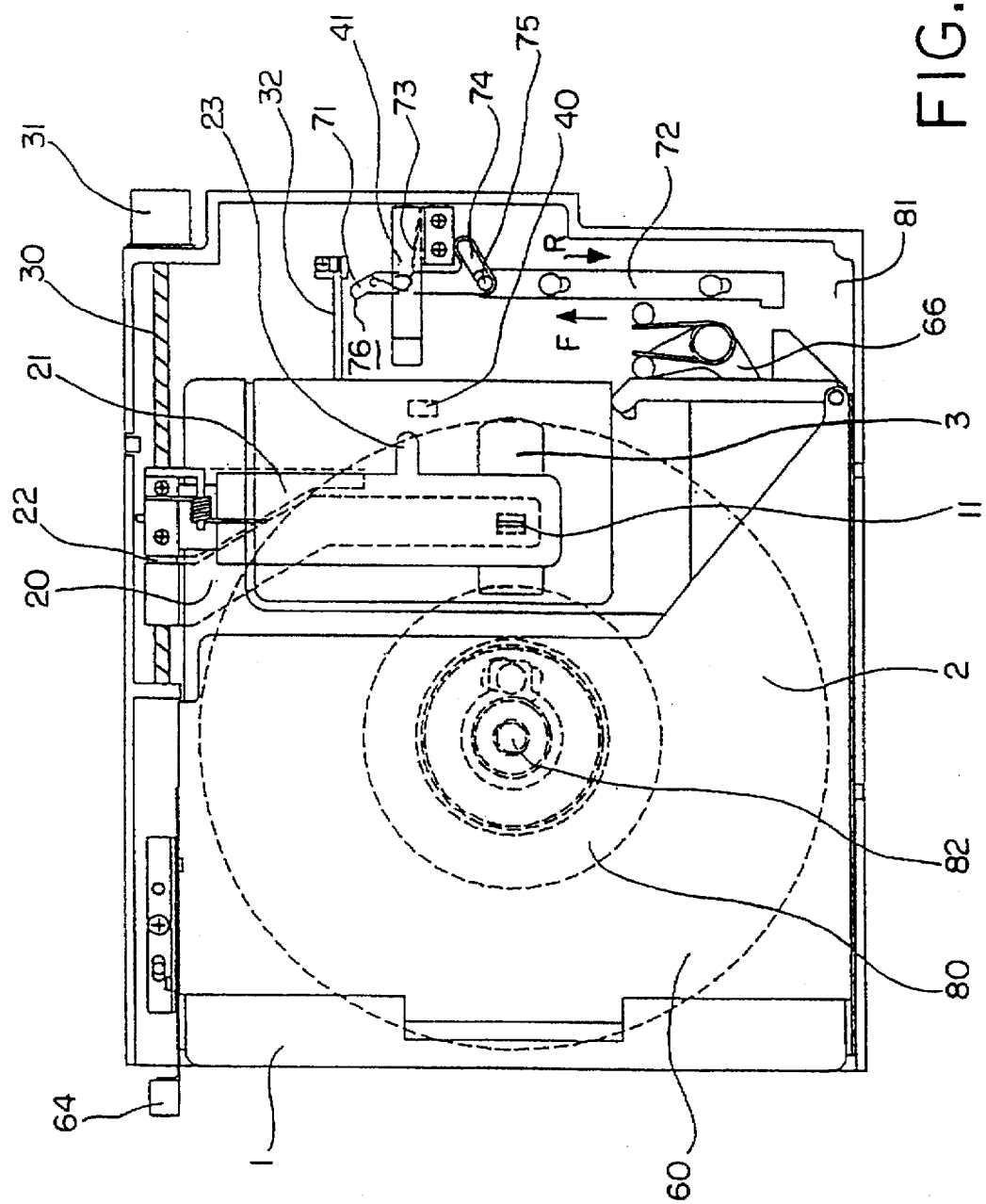
FIG. 1 is a plan view of a first example of the information recording/reproducing apparatus according to the present invention, showing the positions during the recording/reproducing operation.

A first example of the information recording/reproducing apparatus according to the present invention will be described with reference to FIGS. 1 to 6. The apparatus of this example uses a "90 mm flexible disk cartridge" as standardized by JIS for recording/reproducing information on/from the flexible disk.

A cartridge 1 is of a conventional type which stores a rotatable recording medium (flexible disk) 2 therein. The thickness of the cartridge 1 is 3.5 mm or less according to JIS. The cartridge 1 has a head window 3 which is normally covered with a shutter. The shutter is opened when the cartridge 1 is inserted into the apparatus, exposing a part of the recording medium 2. The recording medium 2 is rotated by the rotation of a spindle shaft 82 of a spindle motor 80.

First, a head loading mechanism of this example will be described.

Figure 2:
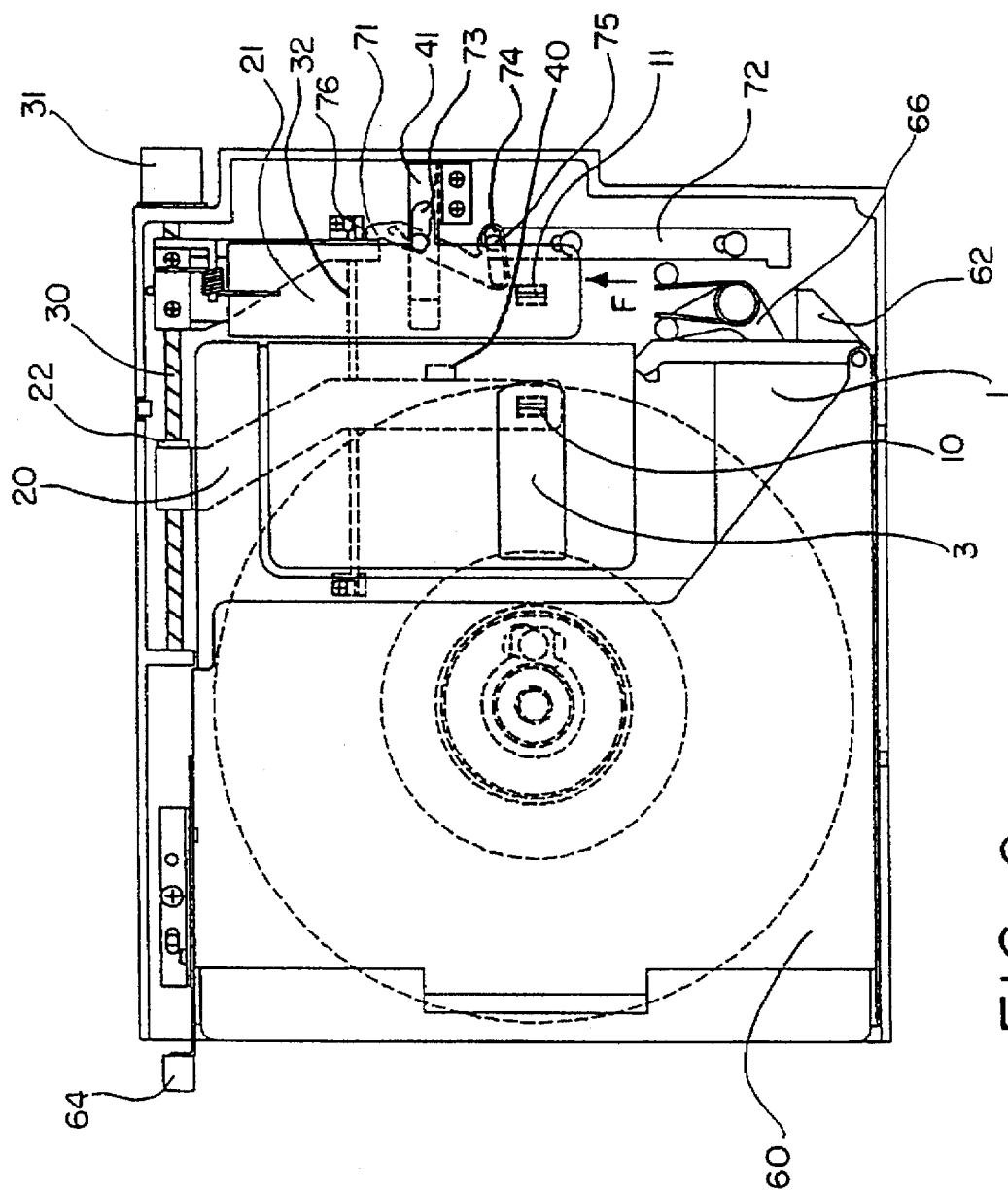
FIG. 2 is a plan view of the first example, showing the positions after the unloading operation.
Figure 6:
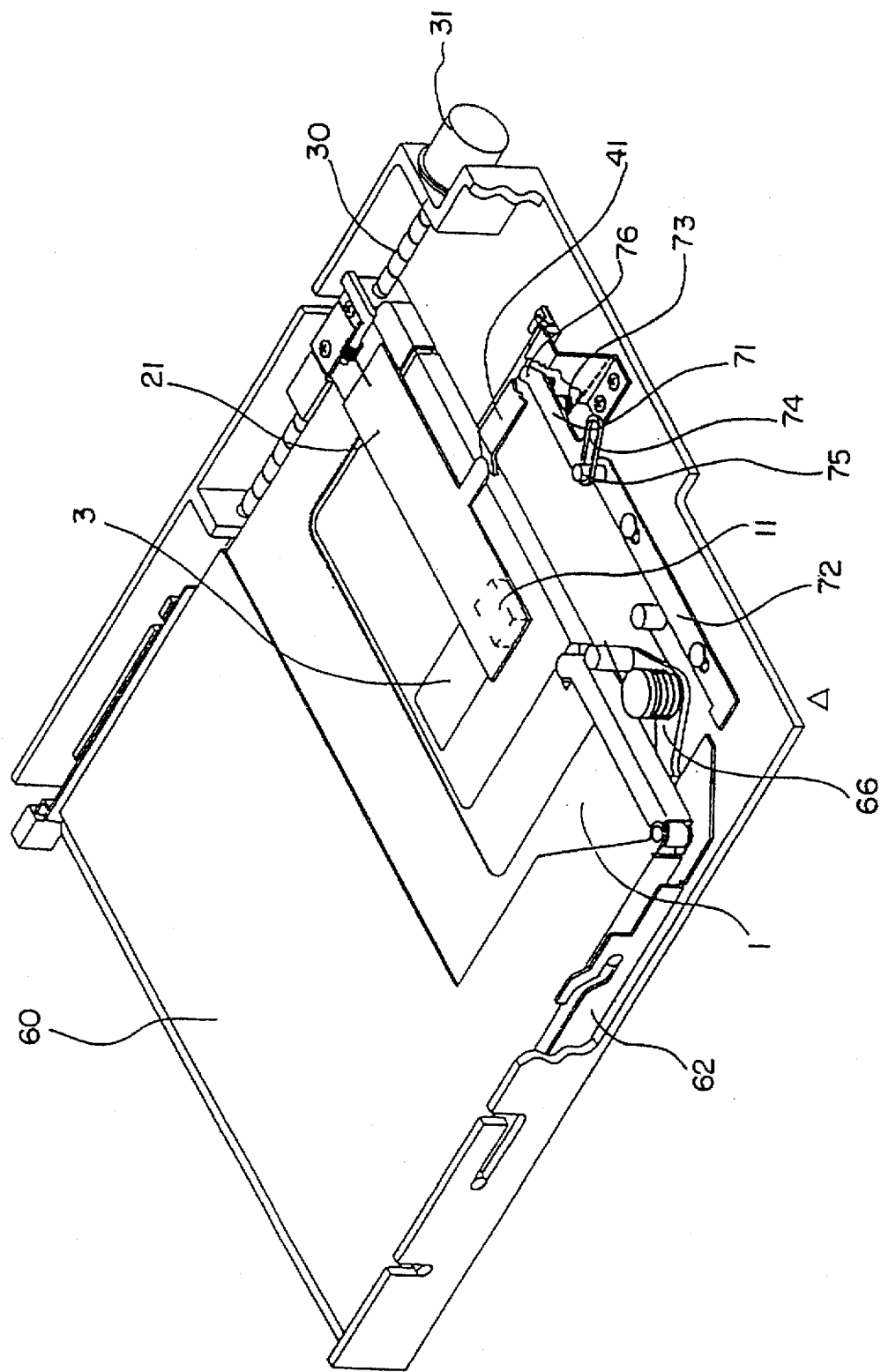
FIG. 6 is a perspective view of the first example, showing the positions during the recording/reproducing operation.

As is more clearly shown in FIGS. 3 and 4, the apparatus of this example includes two heads, i.e., a side 0 head 10 and a side 1 head 11, which are fixed to a side 0 arm 20 and a side 1 arm 21, respectively. The thickness of each of the heads 10 and 11 is 2.1 mm. As shown in FIGS. 1 and 2, the side 0 arm 20 and the side 1 arm 21 can be coupled with each other through a coupling magnet 22 or separated from each other. The side 0 arm 20 and the side 1 arm 21 are slidable along a guide rod 32, so as to move in the radial direction of the recording medium 2 (that is, rightward and leftward as is seen in FIGS. 1 and 2). During the recording/reproducing operation, the side 0 arm 20 and the side 1 arm 21 move along the guide rod 32 so that the side 0 head 10 and the side 1 head 11 be positioned on a selected track of the recording medium 2.

The side 0 arm 20 and the side 1 arm 21 are driven by converting the rotation of a stepping motor 31 into a linear movement through a lead screw 30. The side 1 arm 21 is fixed to the lead screw 30 by being screwed therein, while the side 0 arm 20 is slidably supported by the lead screw 30. When the side 0 arm 20 and the side 1 arm 21 are coupled with each other through the coupling magnet 22, the side 0 arm 20 follows the movement of the side 1 arm 21. When they are not coupled, the rotation of the stepping motor 31 is not transmitted to the side 0 arm 20 through the lead screw 30. By controlling the angle of rotation of the stepping motor 31, the side 1 head 11 can be positioned on a selected point from an innermost recording position of the recording medium 2 to its unloading position shown in FIGS. 2 and 4. The unloading position for the side 1 head 11 is set outside the periphery of the cartridge 1 toward the interior of the apparatus (rightward as is seen in FIG. 2).

As shown in FIGS. 1 and 3, a beam 23 extends from the side 1 arm 21 horizontally toward the interior of the apparatus. A retreat cam 41 for the side 1 arm 21 is disposed on the right side of the body as is seen in the figures. During the movement of the side 1 head 11 from the recording/reproducing position toward its unloading position, the beam 23 of the side 1 arm 21 comes into contact with the retreat cam 41 at a stage when the side 1 head 11 comes to a position outside an outermost recording position of the recording medium 2 by a distance corresponding to two tracks of the recording medium 2. As the side 1 arm 21 further moves toward its unloading position, the retreat cam 41 gradually presses up the beam 23 and thus the side 1 arm 21 (see FIG. 6). As a result, a clearance of 0.5 mm is formed between the bottom surface of the side 1 head 11 and the top surface of the cartridge 1.

As shown in FIG. 1, a side 0 arm stopper 40 is fixed to a base 81 of the apparatus at an appropriate position so that the side 0 arm 20 can abut against the side 0 arm stopper 40 when the side 0 head 10 is moved to its unloading position. As shown in FIG. 2, the unloading position for the side 0 head 10 is outside the outermost recording position by a distance corresponding to two tracks of the recording medium 2. After the abutment, the side 0 arm 20 is retained at the position while the side 1 arm 21 moves further toward its unloading position. In this way, the coupling between the side 0 arm 20 and the side 1 arm 21 through the coupling magnet 22 is discontinued by the blocking of the side 0 arm stopper 40.

The side 0 arm 20, the side 1 arm 21, the coupling magnet 22, the lead screw 30, the stepping motor 31, the guide rod 32, the side 0 arm stopper 40, and the retreat cam 41 are herein generically called the head loading mechanism.

Next, a cartridge loading mechanism of this example will be described.

As shown in FIGS. 3 and 4, the apparatus of this example includes an ejection plate 62 mounted on the base 81 so that it can be translated horizontally with regard to the base 81. It also includes a cartridge holder 60 for holding the cartridge 1. The cartridge holder 60 is mounted on the base 81 so that it can be translated vertically with regard to the base 81. Guide pins 61 extend from the sides of the cartridge holder 60 and fit into guide grooves 63 formed on the sides of the ejection plate 62, thus composing positive cams. When the guide pins 61 are on the top end portion of the guide grooves 63 as shown in FIG. 4, the clearance of 0.5 mm is secured between the top surface of the side 0 head 10 and the bottom surface of the cartridge 1. At the same time, a predetermined clearance is also secured between the top end of the spindle shaft 82 and the bottom surface of the cartridge 1. An ejection button 64 is disposed on the front side of the ejection plate 62. An extension spring 65 is disposed between the ejection plate 62 and the base 81.

The cartridge holder 60, the guide pins 61, the ejection plate 62, the guide grooves 63, the ejection button 64, and the extension spring 65 are herein generically called the cartridge loading mechanism.

An ejection lock mechanism will be then described.

As shown in FIGS. 1 and 2, a lock lever 71 is rotatably mounted on the base 81 and urged counterclockwise by a lock lever spring 73. A lock plate 72 is movably mounted on the base 81 so that it can be translated.

The side 1 arm 21 moving toward its unloading position abuts against a top end 76 of the lock lever 71. By being pressed by the side 1 arm 21, the lock lever 71 rotates clockwise against the urging force of the lock lever spring 73. The lock lever 71 has at the other end thereof a guide hole 74 which fits with a lock plate pin 75 fixed to an end of the lock plate 72.

The lock plate 72 is translated in the direction shown by arrow F when the lock lever 71 rotates clockwise. It is translated in the direction shown by arrow R when the lock lever 71 rotates counterclockwise. During the recording/ reproducing operation when the lock lever 71 has rotated counterclockwise, the lock plate 72 translated in the direction shown by arrow R is retained at a predetermined position. At the retained position, the end portion of the lock plate 72 blocks the ejection plate 62 from being further translated to the interior of the apparatus.

The lock lever 71, the lock plate 72, the lock lever spring 73, and the lock plate pin 75 are herein generically called the ejection lock mechanism.

Next, the operation of the apparatus of this example will be described.

First, the loading/unloading of the heads 10 and 11, the loading/unloading of the cartridge 1, and the operation of the ejection lock mechanism will be separately described. Then, the correlation among these operations when the cartridge 1 is mounted/removed will be described.

The phrase "unloading of the heads" as used herein refers to the operation including transporting the side 0 head 10 and the side 1 head 11 located at the recording/reproducing position to their respective positions so that the cartridge 1 can be smoothly removed from the apparatus while retaining the heads 10 and 11 at these positions. The phrase "loading of the heads" refers to the operation in reverse of the above. These operations are synchronized with ON/OFF signals which are originally supplied to the spindle motor 80 to command the start and stop of the rotation.

The phrase "unloading of the cartridge" as used herein refers to the operation including transporting the cartridge 1 located at the recording/reproducing position to a position where the cartridge 1 can be removed from the apparatus and retaining it at that position. This operation is initiated in association with the user's action of pushing the ejection button 64. The phrase "loading of the cartridge" refers to the operation in reverse of the above, which is initiated in association with the user's action of inserting the cartridge 1 into the cartridge holder 60 through an insertion opening (not shown).

During the recording/reproducing operation, the above-described components are located as shown in FIGS. 1 and 3. The side 0 arm 20 and the side 1 arm 21 are coupled with each other by a magnetic force generated from the coupling magnet 22.

For the start of recording/reproducing, the recording medium 2 should be rotated at a predetermined angular velocity by the spindle motor 80. Simultaneously, the side 0 head 10 and the side 1 head 11 should be positioned on a desired track between the innermost recording position and the outermost recording position of the recording medium 2. This positioning is conducted by controlling the angle of rotation of the stepping motor 31. After the side 0 head 10 and the side 1 head 11 are positioned, data is recorded on or reproduced from the recording medium 2.

When the recording/reproducing operation is finished, the spindle motor 80 receives an OFF signal from a host computer (not shown) and terminates the rotation. At the same time, the side 1 head 11 is moved to its unloading position by the rotation of the stepping motor 31 and retained at the unloading position. The side 0 head 10 is moved together with the side 1 head 11 until it reaches the outermost recording position of the recording medium 2. Thereafter, the side 0 head 10 is separated from the side 1 head 11 and halted at the position outside the outermost recording position by a distance corresponding to two tracks of the recording medium 2, for example. More concretely, the side 0 arm stopper 40 is disposed at that position so that the side 0 head 10 is halted by abutting against the side 0 arm stopper 40. The coupling between the side 0 head 10 and the side 1 head 11 is released by the blocking of the side 0 arm stopper 40, and the side 0 head 10 is retained at that position. The unloading of the heads 10 and 11 is thus completed.

When the side 1 head 11 is moved outside the outermost recording position by a distance corresponding to two tracks of the recording medium 2, the side 1 arm 21 abuts against the top end 76 of the lock lever 71. This initiates the lock lever 71 to rotate clockwise and then the lock plate 72 to be translated in the direction shown by arrow F in FIG. 1. At the time when the side 1 arm 21 reaches its unloading position, the translation of the ejection plate 62 toward the interior of the apparatus which has been blocked by the ejection lock mechanism is released.

At the start of the recording/reproducing operation, the spindle motor 80 starts rotating upon receipt of an ON signal from the host computer. At the same time, the stepping motor 31 starts rotating, transporting the side 1 arm 21 from its unloading position to the outermost recording position and retaining it at that position. On the way to that position, the side 1 arm 21 abuts against the side 0 arm 20 retained at its unloading position. The two arms 20 and 21 are coupled with each other through the coupling magnet 22 in order to be moved together. The loading of the heads 10 and 11 is thus completed. After calibration, the side 0 head 10 and the side 1 head 11 are positioned on a desired track of the recording medium 2 so as to effect the recording/ reproducing operation.

When the user pushes the ejection button 64 while the cartridge 1 is retained at the recording/reproducing position, the ejection plate 62 is translated with regard to the base 81 against the elastic force of the extension spring 65. The guide pins 61 are then guided upward along the guide grooves 63, allowing the cartridge holder 60 to move upward and then to be retained at the upward position. The unloading of the cartridge is thus completed. At this position, the clearance of 0.5 mm is secured between the cartridge 1 and the side 0 head 10, and also the predetermined clearance is secured between the top end of the spindle shaft 82 and the bottom surface of the cartridge 1. Thus, the cartridge 1 is ready for ejection. The ejection plate 62 is retained by a lock claw 66 after it has moved a predetermined distance.

When the side 1 arm 21 is at the recording/reproducing position, the translation of the ejection plate 62 is blocked by the ejection look mechanism, preventing the unloading of the cartridge 1.

The loading of the cartridge 1 is conducted as follows:

When the user presses the cartridge 1 into the cartridge holder 60 through the insertion opening, the ejection plate 62 is released from the retention by the lock claw 66 and translated along the base 81 by the urging force of the extension spring 65. The guide pins 61 are guided downward along the guide grooves 63, lowering the cartridge holder 60 which is then retained at the lower position. The loading of the cartridge 1 is thus completed.

Now, referring to FIGS. 5A to 5C, the interaction between the head loading mechanism and the cartridge loading mechanism when the cartridge 1 is removed from/mounted to the apparatus will be described.

As shown in FIG. 5A, when the recording/reproducing operation is finished, the side 0 head 10 and the side 1 head 11 are moved in the directions shown by arrows B and A, respectively, and then retained at the respective unloading positions. Then, as shown in FIG. 5B, when the user pushes the ejection button 64, the cartridge 1 is moved in the direction shown by arrow C by the cartridge loading mechanism and retained at its unloading position. The cartridge 1 is then ready for the ejection, and as shown in FIG. 5C, it is ejected in the direction shown by arrow D. The ejection of the cartridge 1 is thus completed.

Before the side 1 head 11 reaches its unloading position, movement of the ejection plate 62 is prevented by the ejection lock mechanism even when the user pushes the ejection button 64, and thus the cartridge 1 is kept retained at the recording/reproducing position. The release of the ejection plate 62 and the unloading of the cartridge 1 are possible only after the side 1 head 11 reaches its unloading position.

The mounting of the cartridge 1 can be conducted by reversing the above ejection steps shown in FIGS. 5A to 5C, i.e., starting from the step shown in FIG. 5C. Then, the cartridge 1 is mounted on the recording/reproducing position.

According to this example, the vertical displacement d of the side 1 head 11 is 2.2 mm which is the total of the thickness of the portion of the side 1 head 11 inserted into the cartridge 1 during the recording/reproducing operation (1.7 mm) and the clearance required for the reliability of the operation (0.5 mm). This means that, although the size of the heads is the same as that in the aforementioned conventional apparatus, the vertical displacement is reduced by 2.3 mm as compared with that of the conventional apparatus. This reduction is equal to the lift of the cartridge 1 in the conventional apparatus and is also at least equal to, or more than the thickness of one head.

As described above, the information recording/reproducing apparatus of this example includes the cartridge loading mechanism which selectively retains he cartridge 1 at the recording/reproducing position or at its unloading position, and the head loading mechanism which selectively retains the side 0 head 10 and the side 1 head 11 at the recording/reproducing position or at their respective unloading positions. The unloading position for the side 1 head 11 is located outside the periphery of the cartridge 1. With the above structure, the resultant apparatus can be made thinner by at least the equivalent of the thickness of one head by using the same components as those of the conventional apparatus. Further, since there is no need to make the spindle motor and the apparatus body thinner, the problems such as cost increase and deterioration of the performance of the apparatus which arise in the conventional apparatus are prevented. Thus, according to this example, an apparatus having the same thickness as that of the conventional apparatus can be provided at lower cost and with a better performance.

In this example, the actuator for the head seek is also used for driving the head loading mechanism. Accordingly, the effect of the present invention can be realized without an additional actuator.

Further, since the cam for guiding the side 1 head 11 between the recording/reproducing position and its unloading position is provided, the side 1 head 11 can only be moved horizontally by means of the above-mentioned actuator for the head seek, so as to obtain a precise vertical movement corresponding to its horizontal position. As a result, the cartridge 1 and the heads 10 and 11 are prevented from hitting against each other during the loading/unloading of the cartridge. Thus, the apparatus can be made thinner without complicating the structure and without lowering the reliability.

In this example, the motor ON/OFF signals conventionally used as the start/stop commands for the spindle motor 80 are also used as a trigger for driving the stepping motor 31 and thus for effecting the loading/unloading of the heads 10 and 11. Therefore, since no additional signal is required for the loading/unloading of the heads 10 and 11, no modification is required for the interface signal between the host computer and the apparatus.

The ejection lock mechanism of this example can retain the cartridge 1 at the recording/reproducing position by blocking the operation of the cartridge loading mechanism until the heads 10 and 11 are retained at the respective unloading positions. Accordingly, the unloading of the cartridge 1 will not be initiated even if the user mistakenly pushes the ejection button 64 during the recording/reproducing operation. Thus, the apparatus of this example can prevent critical accidents such as deleting important data or recording wrong data and troubles such as damaging the cartridge and heads by their hitting against each other. This makes possible an apparatus with a reduced thickness and with excellent reliability.

According to this example, the heads 10 and 11 are in contact with the recording medium after the recording medium 2 starts rotating. Therefore, a statical friction does not occur by the contact of the recording medium 2 and the heads 10 and 11, resulting in significantly reducing the starting torque of the recording medium 2. This makes it possible to use a smaller spindle motor which also enables the apparatus to be made thinner.

In this example, the unloading position for the side 1 head 11 is located behind the cartridge 1 set at the recording/reproducing position. However, the unloading position can be anywhere as long as it is outside the periphery of the cartridge, and provides effects similar to those obtained by this example.

The apparatus of this example is adapted to receive a flexible disk cartridge. However, the apparatus can also be adapted to replaceably receive an optical disk, a replaceable rigid magnetic disk, or other recording or reproducing media stored in a case. Especially, this example is most suitably adapted for a magnetooptic disk unit of a magnetic modulation type in which an optical head and a magnetic head are disposed so as to be positioned on opposite surfaces of a recording medium.

EXAMPLE 2

A second example of the information recording/reproducing apparatus according to the present invention will be described with reference to FIGS. 7 to 10 and 11A to 11C.

In Example 1, motor ON/OFF signals used as the start/stop commands for the spindle motor 80 are also used as a trigger for driving the stepping motor 31 and thus for effecting the loading/unloading of the heads 10 and 11. The apparatus of this example is provided with a detection device which detects whether the ejection button 64 has been pushed by the user. When the ejection button 64 is pushed, the detection apparatus generates a detection signal which is used as a trigger for driving the stepping motor 31 and a solenoid 52 and thus effecting the unloading of the heads 10 and 11.

Also, in Example 1, the retreat cam 41 for regulating and guiding the side 1 head 11 between the recording/reproducing position and its unloading position is fixed to the base 81. In this example, a rotating cam 51 is rotatably disposed so as to be rotated by the solenoid 52.

Figure 8:
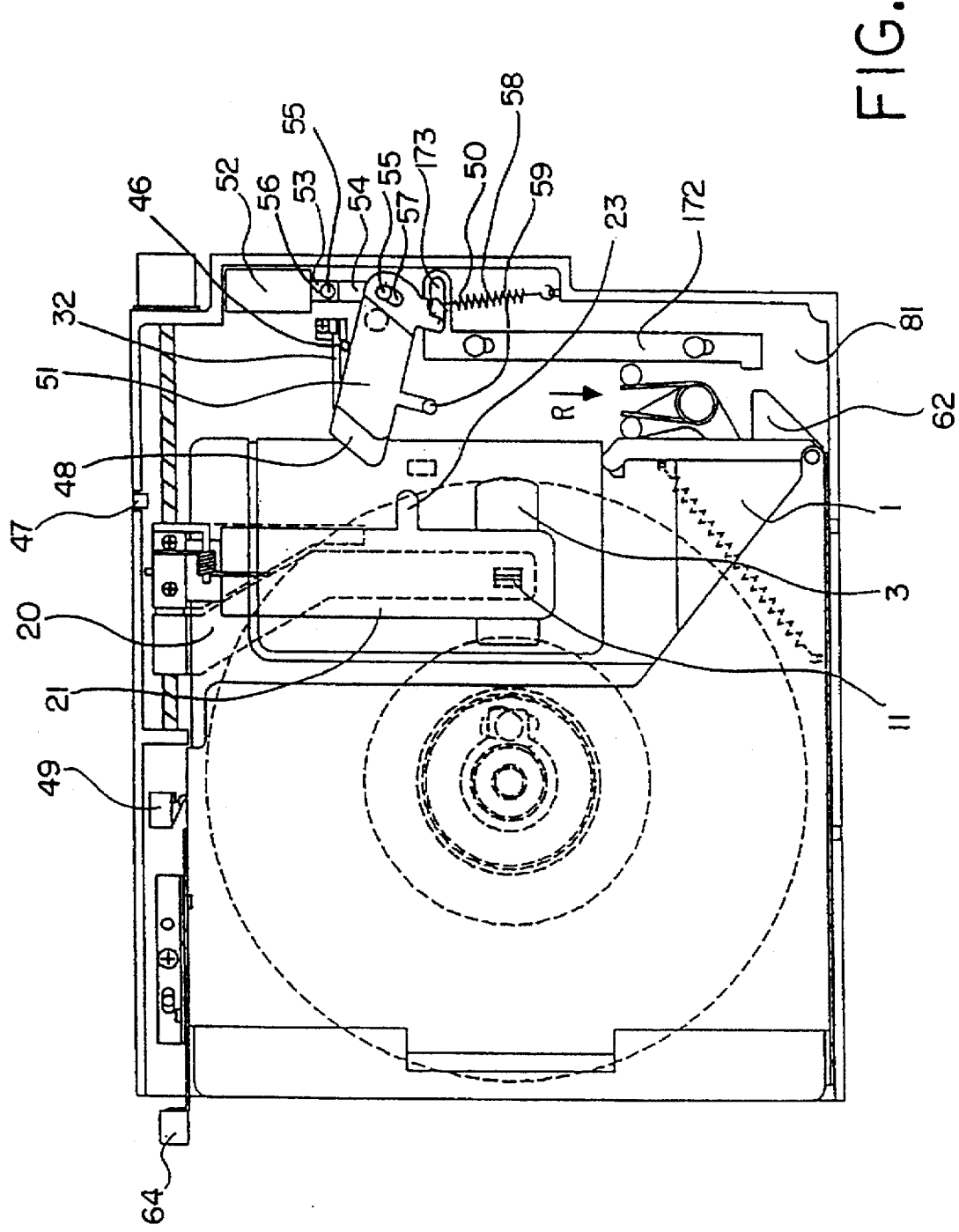
FIG. 8 is a plan view of the second example, showing the positions during the recording/reproducing operation.

As shown in FIG. 8, the apparatus of this example is provided with a head unloading switch 49. When the cartridge 1 is at the recording/reproducing position, the head unloading switch 49 is not in contact with the top end of the ejection plate 62. When the user pushes the ejection button 64 for electing the cartridge, the ejection plate 62 is translated toward the interior of the apparatus. As a result, the top end of the ejection plate 62 comes into contact with the head unloading switch 49, which is thereby turned on, indicating that the ejection button 64 has been pushed by the user. Thus, the unloading of the side 1 head 11 is initiated.

Figure 7:
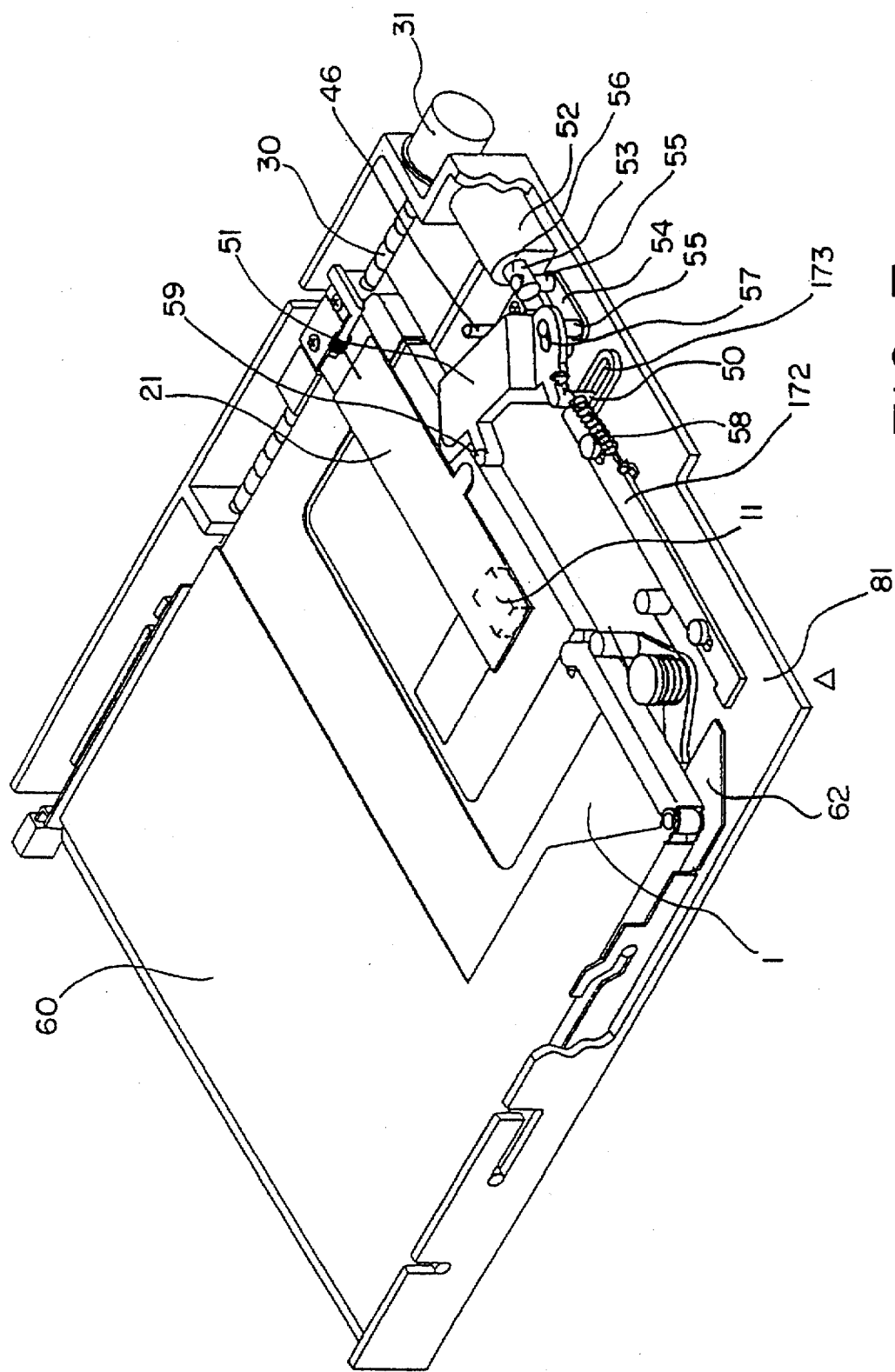
FIG. 7 is a perspective view of a second example of the information recording/reproducing apparatus according to the present invention, showing the positions during the recording/reproducing operation.

As shown in FIG. 7, the rotating cam 51 is rotatably disposed on the base 81. The rotating cam 51 is urged clockwise by an extension spring 58. The rotating cam 51 has an inclined cam portion 48 at one end (see FIG. 8) which engages with the beam 23 of the side 1 arm 21. A cam driving pin 59 is integrally formed with the rotating cam 51. When the side 1 arm 21 reaches a predetermined position on the way to its unloading position, the end face of the side 1 arm 21 abuts against the cam driving pin 59, forcing the rotating cam 51 to rotate counterclockwise. The rotating cam 51 is also provided with a lock plate driving pin 50, which fits in an elongated lock plate groove 173 formed on one end of a lock plate 172. The lock plate 172 is translationally disposed on the base 81. When energized, the solenoid 52 pulls core 53 into the body thereof. A coupling plate 54 has two coupling pins 55 one of which fits in an insertion hole 56 formed on the end of the core 53 and the other fits in an elongated groove 57 formed on the rotating cam 51.

Other components of the apparatus of this example are the same as those of Example 1. The description thereof is therefore omitted.

In this example, the head loading mechanism includes the side 0 arm 20, the side 1 arm 21, the coupling magnet 22, the lead screw 30, the stepping motor 31, the guide rod 32, the side 0 arm stopper 40, the rotating cam 51, the solenoid 52, the core 53, the coupling plate 54, the coupling pins 55, and the extension spring 58. The ejection lock mechanism includes the rotating cam 51, the solenoid 52, the core 53, the coupling plate 54, the coupling pin 55, the extension spring 58, and the lock plate 172. The cartridge loading mechanism of this example has the same structure as that of Example 1.

The operation of the apparatus of this example will be described.

First, the loading/unloading of the heads 10 and 11, the loading/unloading of the cartridge 1, and the operation of the ejection lock mechanism will be separately described. Then, the correlation between these operations when the cartridge 1 is removed will be described.

When the head unloading switch 49 detects that the user has pushed the ejection button 64, the unloading of the side 1 head 11 is initiated. The unloading of the cartridge 1 is the same as that of Example 1, which is conducted only after the unloading of the side 1 head 11 is completed.

During the recording/reproducing operation, the above-mentioned components are positioned as shown in FIGS. 8 and 11A. Since the solenoid 52 is not energized during this operation, the rotating cam 51 is retained at the position shown in FIG. 8 by being urged by the extension spring 58. As far as the rotating cam 51 is retained at this position, the cam portion 48 thereof does not engage with the beam 23 of the side 1 arm 21 even when the side 1 head 11 comes to the outermost recording position. Thus, the operation of the side 1 head 11 will not be blocked by the rotating cam 51 during the recording/reproducing operation.

The lock plate 172 is retained at an advanced position after being moved in the direction shown by arrow R. The top end of the lock plate 172 blocks an excessive translation of the ejection plate 62 toward the interior of the apparatus. Under this state, the ejection plate 62 is not allowed to move a distance long enough for the cartridge 1 to be lifted, i.e., to be placed at its unloading position by the cartridge loading mechanism.

Figure 9:
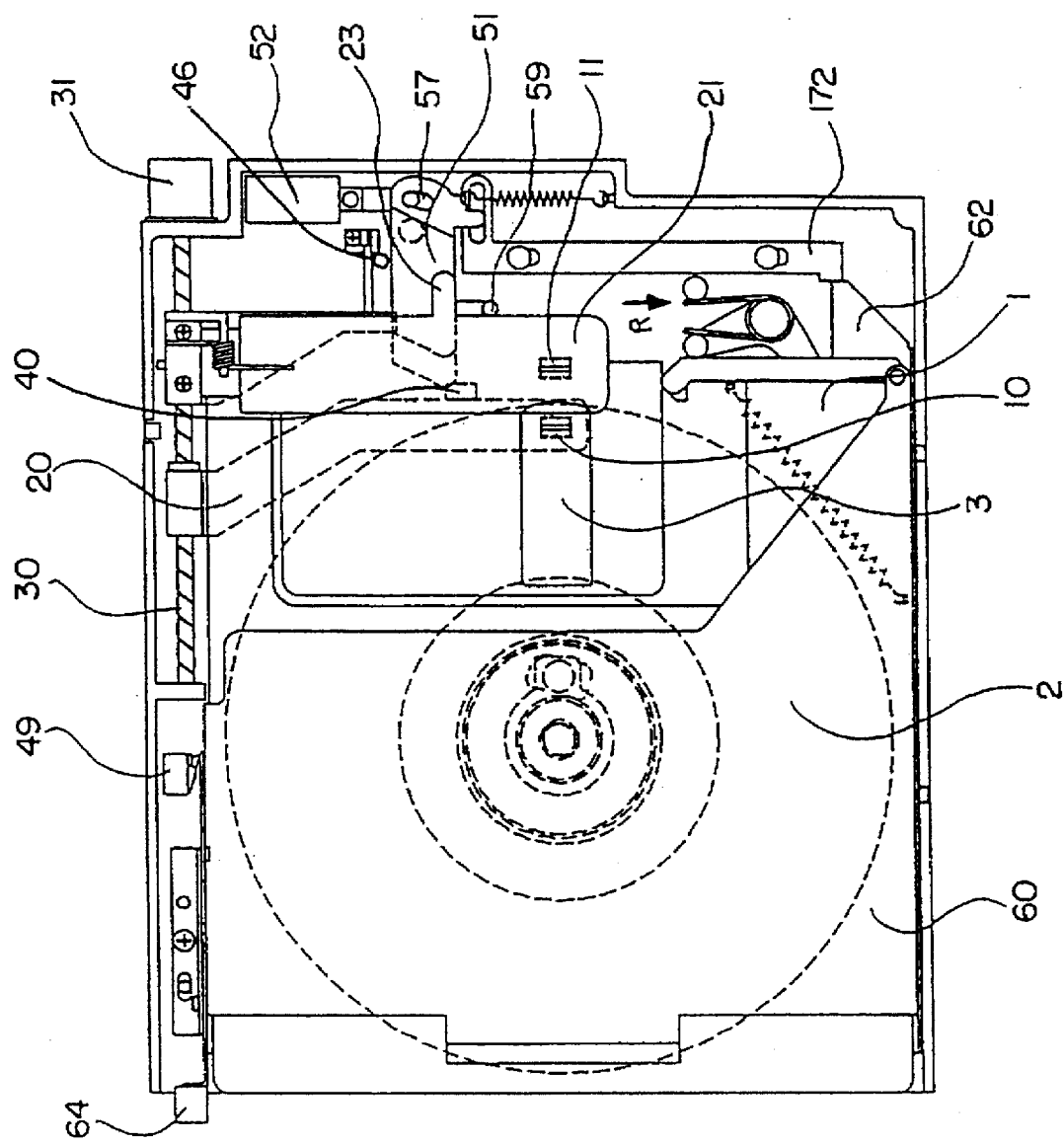
FIG. 9 is a plan view of the second example, showing the positions under the head unloading operation.
Figure 10:
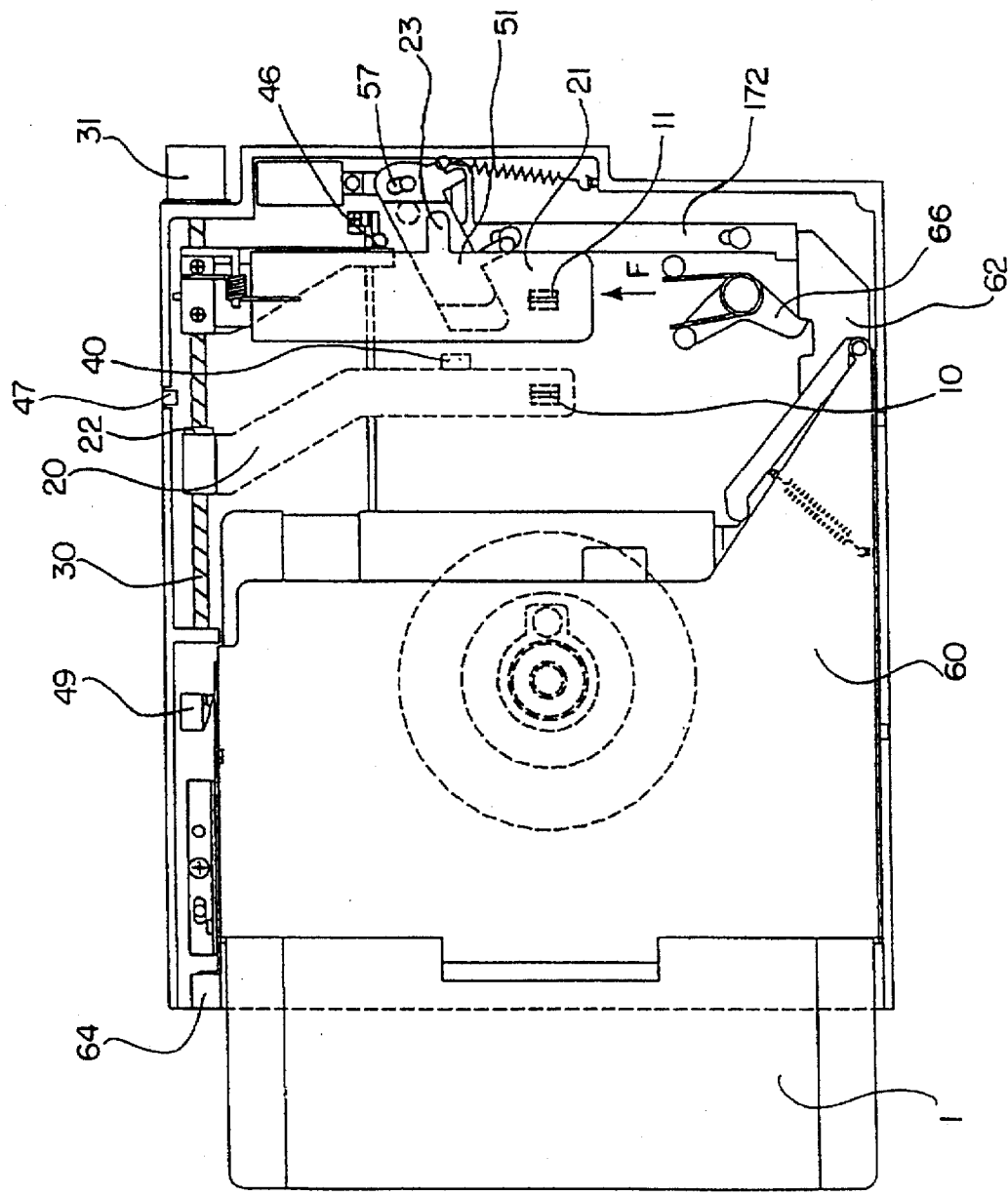
FIG. 10 is a plan view of the second example, showing the positions after the unloading operation.
Figure 12:
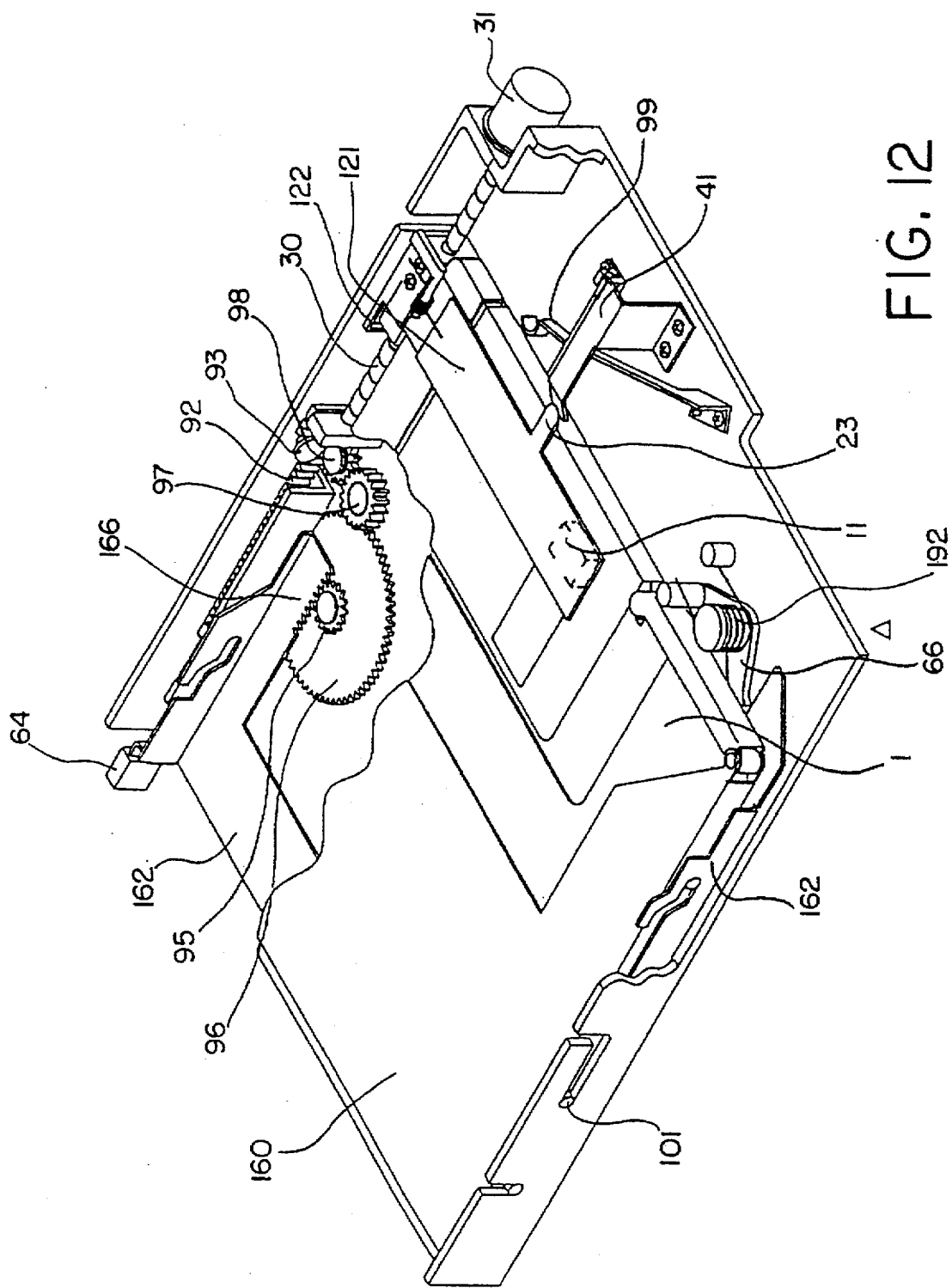
FIG. 12 is a perspective view of a third example of the information recording/reproducing apparatus according to the present invention, showing the positions during the recording/reproducing operation.

The unloading operation is conducted as follows:

When the recording/reproducing operation is finished and the user pushes the ejection button 64, the ejection plate 62 is translated a predetermined distance toward the interior of the apparatus. At this moment, as described earlier, the head unloading switch 49 is turned on, and the further translation of the ejection plate 62 is blocked. With the head unloading switch 49 being turned on, the solenoid 52 is energized and the core 53 retreats. Then, the rotating cam 51 rotates counterclockwise toward the cartridge 1 against the urging force of the extension spring 58, and as a result, is retained at an operational position above the cartridge 1, as shown in FIGS. 9 and 11B. After a predetermined time period during which the core 53 completes the retreat into the body of the solenoid 52, the stepping motor 31 starts rotating, initiating the movement of the side 1 head 11 toward the periphery of the recording medium 2. When the side 1 head 11 comes to or around the outermost recording position, the beam 23 engages with the inclined cam portion 48 of the rotating cam 51. The side 1 arm 21 slides upward along the inclined cam portion 48 while being moved toward the interior of the apparatus, so as to be lifted to a position where the side 1 head 11 is not in contact with the rim of the head window 3. Thus, the clearance of approximately 0.5 mm is ensured between the top surface of the cartridge 1 and the bottom surface of the side 1 head 11. The side 1 arm 21 is further moved toward the interior of the apparatus by the rotation of the stepping motor 31, and when it has been moved toward the periphery of the cartridge 1 from the outermost recording position by a distance corresponding to a specified number of pulses, the stepping motor 31 and the solenoid 52 are turned off. By this time, the distal end face of the side 1 arm 21 abuts against the cam driving pin 59, and the rotating cam 51 further rotates counterclockwise until the coupling pin 55 thereof comes to the farthest position in the elongated groove 57. Thus, the rotating cam 51 is retained at the retreat position as shown in FIG. 10 holding the side 1 arm 21 at this position. In this way, both the side 1 arm 21 and the rotating cam 51 completely retreat outside the periphery of the cartridge 1. The unloading of the side 1 head 11 is thus completed.

At the same time, by the counterclockwise rotation of the rotating cam 51, the lock plate 172 moves in the direction shown by arrow F in FIG. 10. This releases the blocking against the translation of the ejection plate 62 toward the interior of the apparatus, which coincides with the completion of the unloading of the side 1 head 11. Thereafter, the unloading of the cartridge 1 is effected by the cartridge loading mechanism in the same manner as that described in Example 1.

As in Example 1, the side 0 head 10 is moved together with the side 1 head 11 until it reaches the outermost recording position. Then, when the side 0 arm 20 is further moved by a distance corresponding to two tracks of the recording medium 2, it abuts against the side 0 arm stopper 40. By being blocked by the side 0 arm stopper 40, the side 0 arm 20 is separated from the coupling with the side 1 arm 21 through the coupling magnet 22 and retained at that position. A track 0 detection sensor 47 detects whether the side 0 head 10 and the side 1 head 11 has reached the outermost recording position.

Then, the loading operation will be described.

Before the loading operation starts, the components of the apparatus are positioned as shown in FIGS. 10 and 11C. The side 1 arm 21 and the rotating cam 51 are at their retreat positions in the interior of the apparatus. When the user inserts the cartridge 1 into the apparatus, the cartridge 1 is loaded to the recording/reproducing position by the cartridge loading mechanism as described in Example 1. To start the recording/reproducing operation, the stepping motor 31 is initiated so as to rotate in response to the command supplied from the host computer, so that the side 1 head 11 is moved from its unloading position to the outermost recording position for positioning. At the same time, the rotating cam 51 rotates clockwise by the urging force of the extension spring 58 while the cam driving pin 59 is kept in contact with the side 1 arm 21. The rotating cam 51 stops rotating when it abuts against a cam stopper 46 and is retained at that position. In accordance with the rotation of the rotating cam 51, the lock plate 172 is translated in the direction shown by arrow R in FIG. 9, and retained at the position where the end of the lock plate 172 blocks the translation of the ejection plate 62 toward the interior of the apparatus. As described in Example 1, on the way to the outermost recording position, the side 1 arm 21 comes into contact with the side 0 arm 20 which is located at its unloading position. The two arms 20 and 21 are coupled together through the coupling magnet 22 and moved together to the outermost recording position. The loading of the heads 10 and 11 is thus completed. After calibration, the side 0 head 10 and the side 1 head 11 are positioned on a desired track to effect the recording/reproducing of data.

The relationship of the positions of the side 0 head 10, the side 1 head 11, and the cartridge 1 during the mounting/removal of the cartridge 1 to/from the apparatus conducted by the head loading mechanism, the cartridge loading mechanism, the head unloading switch, and the injection lock mechanism will be described. The relationship is as described in Example 1 with reference to FIGS. 5A to 5C.

The relationship when the cartridge 1 is removed will be described. Referring to FIG. 5A, when the recording/reproducing operation is finished, and the ejection button 64 is pushed by the user, the head unloading switch 49 is turned on. At the same time, the side 0 head 10 and the side 1 head 11 are moved in the directions shown by arrows B and A, respectively, and then retained at the respective unloading positions. At the same time, the blocking against the cartridge loading mechanism by the ejection lock mechanism is released. The ejection operation by the user is continued, and as shown in FIG. 5B, the cartridge 1 is moved in the direction shown by arrow C by the cartridge loading mechanism and retained at its unloading position. The cartridge 1 is then ready for ejection, and as shown in FIG. 5C, it is ejected in the direction shown by arrow D. The removal of the cartridge 1 is thus completed.

The mounting of the cartridge 1 can be conducted by reversing the above ejection steps shown in FIGS. 5A to 5C, i.e., starting from the step shown in FIG. 5C. Then, the cartridge 1 is placed on the recording/reproducing position.

According to this example, as in Example 1, The vertical displacement d of the side 1 head 11 is 2.2 mm which is the total of the thickness of a portion of the side 1 head 11 inserted into The cartridge 1 during the recording/reproducing operation (1.7 mm) and the clearance required for the reliability of the operation (0.5 mm). This means that, as in Example 1, the vertical displacement is reduced by 2.3 mm as compared with that of the conventional apparatus. This reduction is equal to the lift of the cartridge 1 in the conventional apparatus and also equal to or more than the thickness of one head.

According to this example, the rotating cam 51 is disposed so as to engage with the side 1 head 11 for guiding it along the passage between the recording/reproducing position and its unloading position. To accomplish this operation, the rotating cam 51 is rotatable between the advanced position where the end portion of the rotating cam 51 projects over the cartridge 1 at the loaded position and the retreat position located outside the periphery of the cartridge 1 at the loaded position. When the cartridge 1 is under the loading/unloading operation, the rotating cam 51 is retained at the retreat position. Only during the unloading of the side 1 head 11, the rotating cam 51 is rotated to the advanced position over the cartridge 1 and retained at that position so as to engage with the side 1 arm 21. Accordingly, the rotating cam 51 is prevented from hitting against the cartridge 1 during the loading/unloading operation of the cartridge 1.

As stated above, since the end of the rotating cam 51 at the advanced position projects over the cartridge 1, it is possible to start the upward movement of the side 1 head 11 at a position inside the outermost recording position. This makes it possible for the side 1 head 11 to take a longer horizontal distance until it is lifted from the inside of the head window 3 up to a point where the clearance from the top surface of the cartridge 1 becomes 0.5 mm. In other words, the lifting of the side 1 head 11 can be started at a position sufficiently inside the periphery of the recording medium 2 so %hat the side 1 head 11 can be lifted without hitting against the rim of the head window 3. Further, the inclination angle of the inclined cam portion 48 can be reduced. As a result, the friction between the inclined cam portion 48 and the beam 23 in the horizontal direction can be reduced, and thus the load on the stepping motor 31 for driving the side 1 arm 21 can be reduced. That is, according to this example, the unloading of the side 1 head 11 can be conducted with high reliability, and the load on the stepping motor 31 for the head seek can be reduced.

Further, according to this example, the head unloading switch 49 is provided for detecting whether the ejection button 64 has been pushed by the user. When the head unloading switch 49 is turned on indicating that the ejection button 64 has been pushed, the head loading mechanism starts operating. With this structure, the loading/unloading of the heads 10 and 11 are conducted only when required, i.e., when the loading/unloading of the cartridge 1 are conducted. This minimizes the time required for energizing the stepping motor 31 and the solenoid 52, thus saving electricity.

Thus, according to this example, the apparatus is made thinner at least the equivalent of the thickness of one head though the thickness of the components are the same as those in the conventional apparatus. The apparatus also consumes less electricity and provides higher reliability.

The solenoid 52 is used for driving the rotating cam 51 in this example. However, a rotary motor or other actuators can also be used to provide the same effects as described above.

EXAMPLE 3

A third example of the information recording/reproducing apparatus according to the present invention will be described with reference to FIGS. 12 to 17 and 18A to 18D.

As in Example 1, the head loading mechanism of this example selectively places only the side 1 head 11 at the recording/reproducing position or at its unloading position. However, instead of using the stepping motor 31 which is also an actuator for the head seek, the apparatus of this example uses the force applied by the user to push the ejection button 64 for driving the head loading mechanism. Using this force, the head loading mechanism is operated in association with the cartridge loading mechanism.

In this example, components corresponding to those in Example 1 are denoted by the same reference numerals, and only points different from Example 1 will be described.

First, the head loading mechanism of this example will be described.

Figure 13:
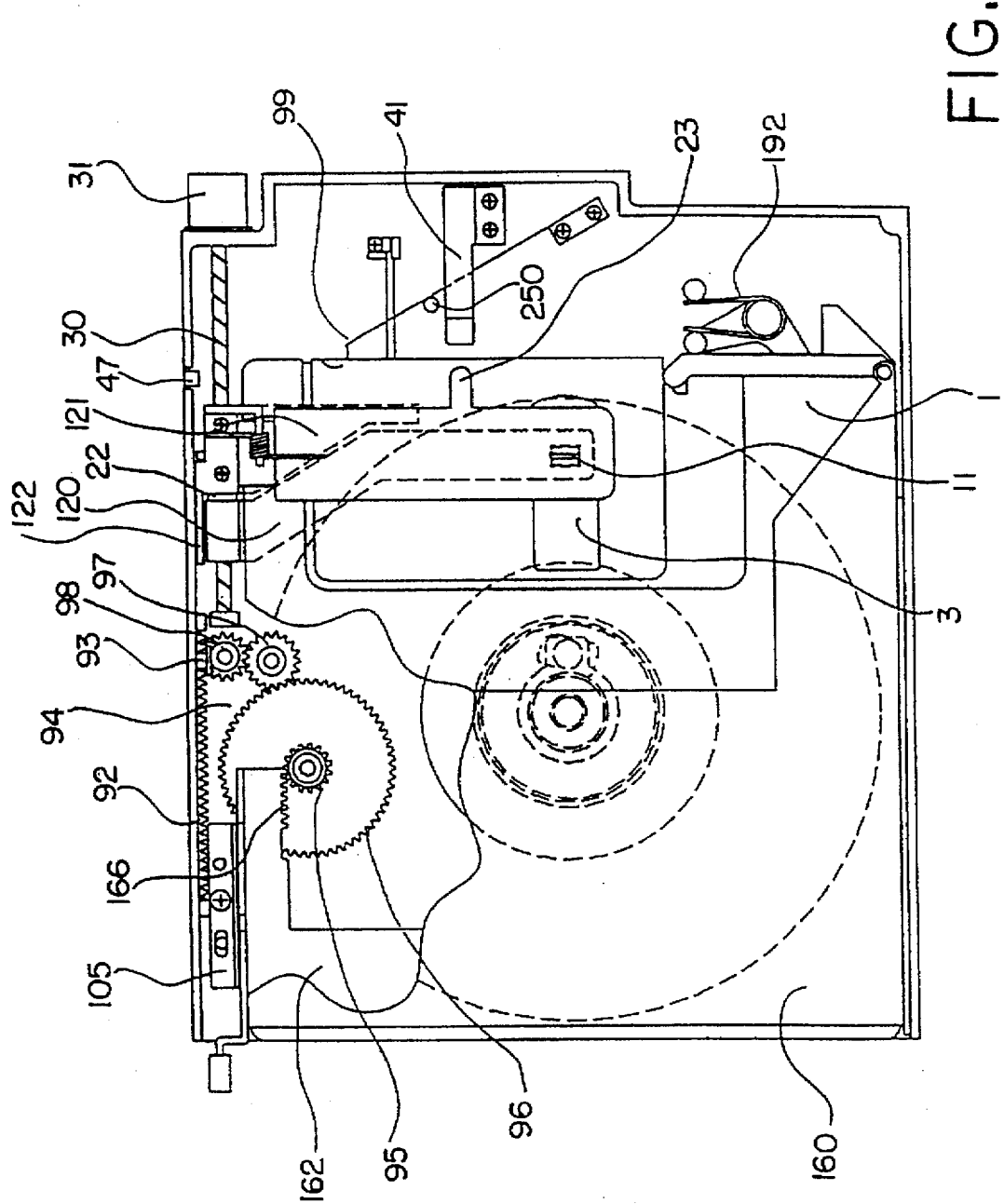
FIG. 13 is a plan view of the third example, showing the positions during the recording/reproducing operation.
Figure 14:
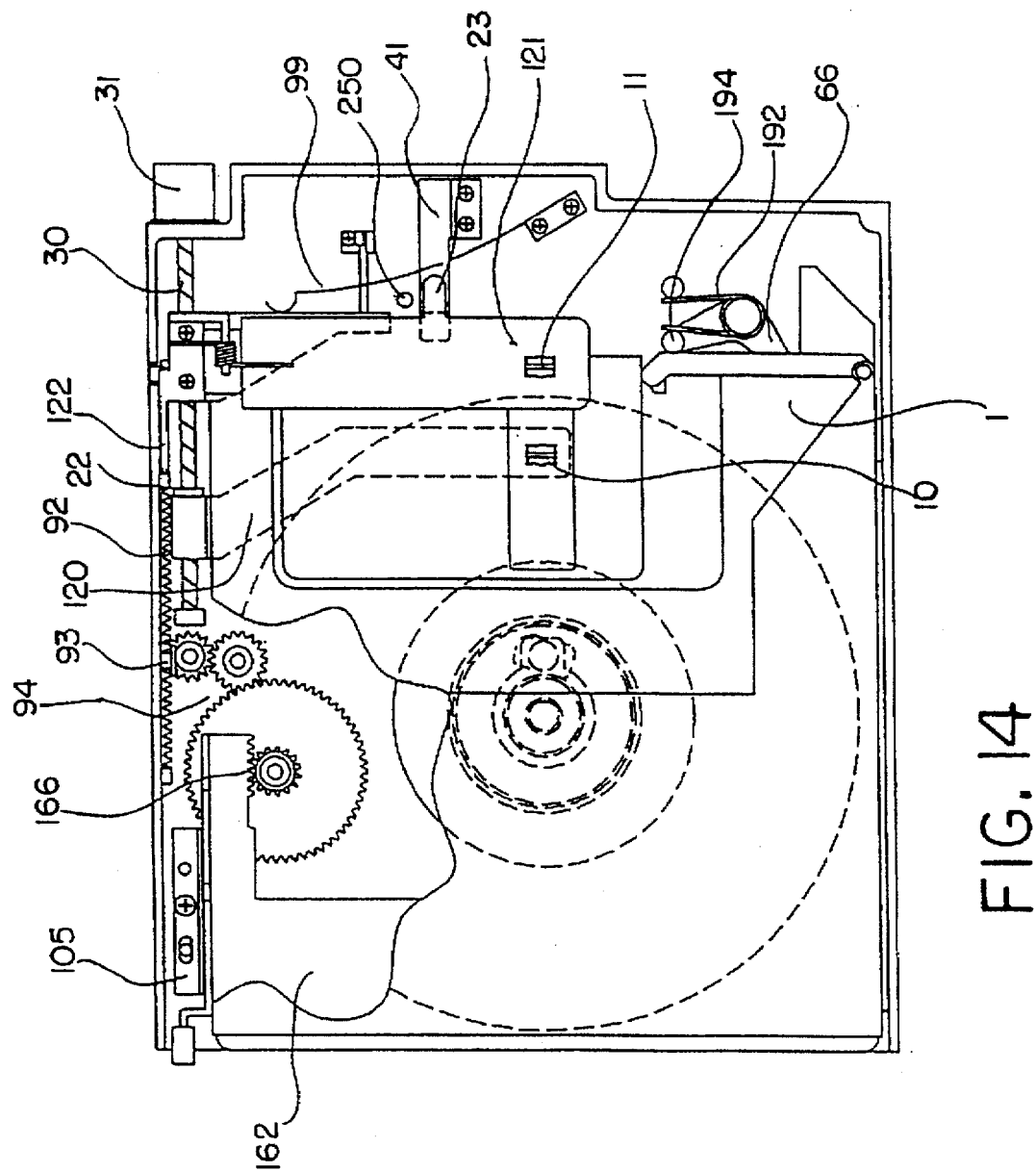
FIG. 14 is a plan view of the third example, showing the positions under the unloading operation.
Figure 15:
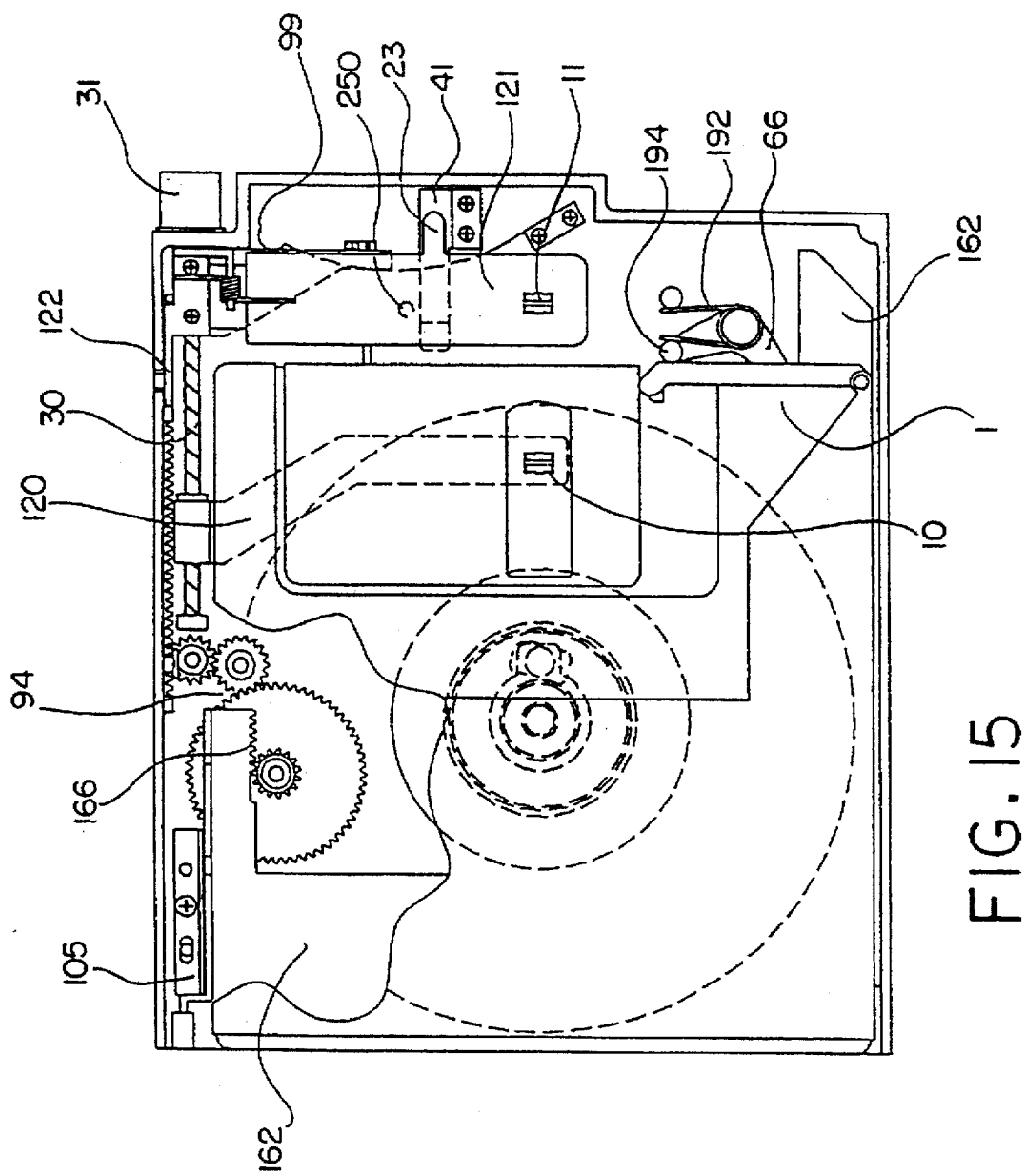
FIG. 15 is a plan view of the third example, showing the positions after the unloading operation.

Referring to FIGS. 13 to 15, the side 0 arm 120 is fixed to the lead screw 30 by being screwed thereinto. The side 1 arm 121 is coupled with the side 0 arm 120 through the coupling magnet 22 during the recording/reproducing operation as shown in FIG. 13. During the unloading of the cartridge as shown in FIG. 14, however, the side 0 arm 120 and the side 1 arm 121 are separated from each other.

The apparatus of this example includes a retreat rack (driving plate) 92 supported on the base 81 so as to be slidable under the guidance of a rack guide pin 93. The apparatus also includes a train of gears 94 composed of four gears rotatably supported on the base 81; a first-stage gear 95, a second-stage gear 96, a third-stage gear 97, and a final-stage gear 98. The final-stage gear 98 engages with the retreat rack 92.

The first-stage gear 95 engages with a driving rack 166 formed on an ejection plate (operating member) 162. When the ejection plate 162 is driven toward the interior of the apparatus, the stroke of the ejection plate 162 is amplified by the train of gears 94, causing the retreat rack 92 to slide in the same direction as that of the ejection plate 162. As the retreat rack 92 slides, the top end thereof abuts against an extrusion 122 extruding from the side 1 arm 121. The side 1 arm 121 is then released from the coupling with the side 0 arm 120 screwed in the lead screw 30 and pressed by the retreat rack 92 toward the interior of the apparatus.

The beam 23 engages with the retreat cam 41 at the stage when the side 1 head 11 has come outside the outermost recording position by a distance corresponding to two tracks. Then, the beam 23 slides upward along the inclined surface of the retreat cam 41, while the side 1 arm 121 presses a pressure spring 99. Thus, the side 1 head 11 is lifted from the inside of the head window 3 and retreats from the cartridge 1. When the side 1 arm 121 finally reaches a predetermined position on the horizontal surface of the retreat cam 41, the side 1 head 11 is retained at that position as its unloading position.

When the ejection plate 162 is driven back toward the insertion opening (leftward as is seen in FIG. 13), the retreat rack 92 is also slid back in the same direction. At this time, the side 1 arm 121 which has been retained against the urging force of the pressure spring 99 is moved back toward the insertion opening following the retreat rack 92 with the extrusion 122 keeping in contact with the top end of the retreat rack 92.

Thus, the head loading mechanism of this example includes the side 0 arm 120, the side 1 arm 121, the coupling magnet 22, the guide rod 32, the retreat cam 41, the retreat rack 92, the rack guide pin 93, the train of gears 94, end the pressure spring 99.

Then, the cartridge loading mechanism of this example will be described.

Figure 16A:
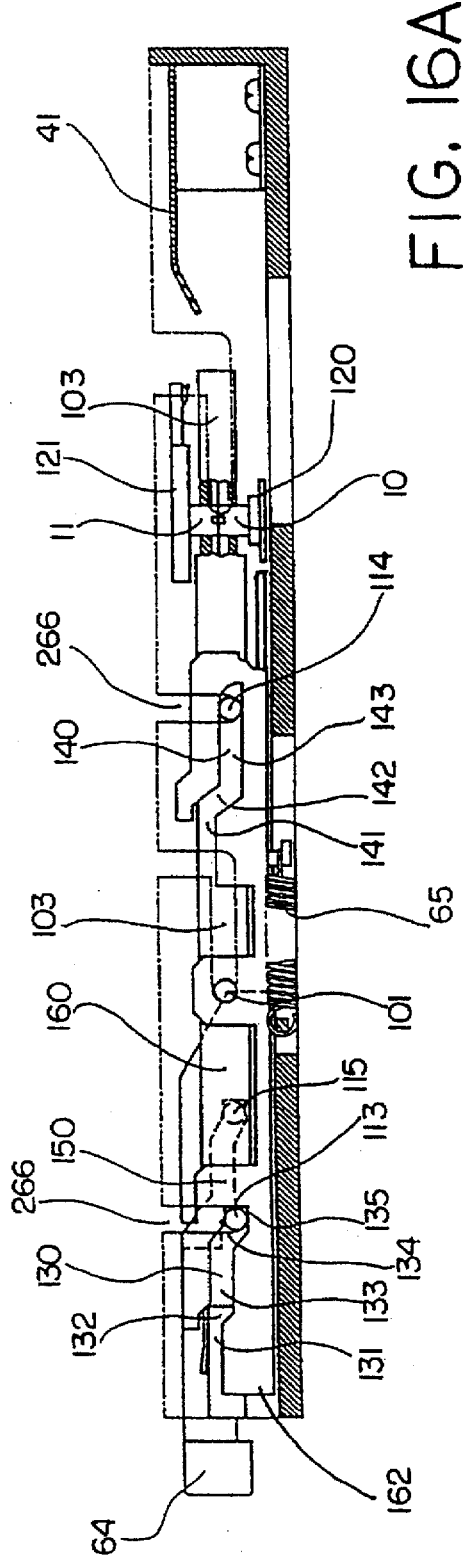
Figure 16B:
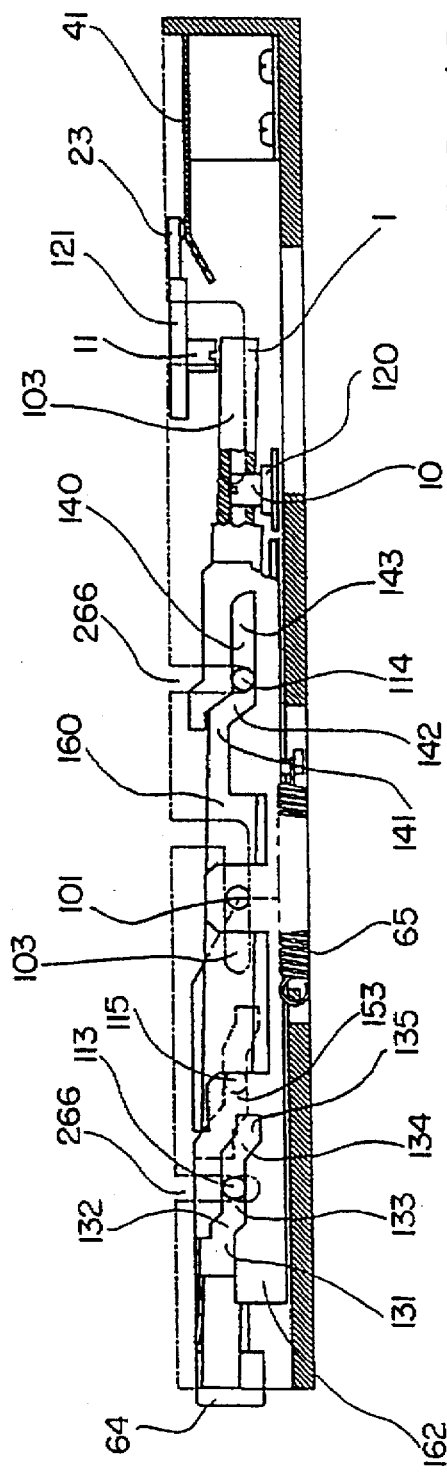

As shown in FIGS. 16A to 16C, a first guide groove 130 and a second guide groove 140 are formed on one side wall of the ejection plate 162 (the side wall on the right side as is seen from the insertion opening of the apparatus, which is hereinafter referred to as the right side wall) at positions closer to and farther from the insertion opening, respectively. Also, as shown in FIG. 17, a third guide groove 150 is formed on the other side wall of the base 81 (the side wall on the left side as is seen from the insertion opening of the apparatus which is hereinafter referred to as the left side wall).

As shown in FIGS. 16A, 16B, and 16C, each of the guide grooves 130, 140, and 150 is composed of inclined grooves and horizontal grooves of different lengths. More specifically, the first guide groove 130 includes a first groove A portion 131, a first groove C portion 133, and a first groove E portion 135 which are horizontal grooves, and a first groove B portion 132 and a first groove D portion 134 which are inclined grooves. The second guide groove 140 includes a second groove A portion 141 and a second groove C portion 143 which are horizontal grooves, and a second groove B portion 142 which is an inclined groove. The third guide groove 150 includes a third groove A portion 151, a third groove C portion 153, and a third groove E portion 155 which are horizontal grooves, and a third groove B portion 152 and a third groove D portion 154 which are inclined grooves.

A first guide pin 113, a second guide pin 114, and a third guide pin 115 disposed on the side walls of the cartridge holder 160 fit in the first guide groove 130, the second guide groove 140, and the third guide groove 150, respectively. The first guide pin 113 and the second guide pin 114 further fit in a pair of first cartridge holder guide grooves 166 which are vertically formed on the right side wall of the base 81. The third guide pin 115 further fits in a second cartridge holder guide groove 167 formed on an ejection plate guide member 105. Accordingly, the cartridge holder 160 is movable only vertically.

The ejection plate 162 is provided with a first ejection plate guide pin 101 on the right side wall as shown in FIGS. 16A to 16C, and a second ejection plate guide pin 102 on the left side wall as shown in FIG. 17. The first ejection plate guide pin 101 fits in a first ejection plate guide groove 103 formed horizontally on the right side wall of the base 81. The second ejection plate guide pin 102 fits in a second ejection plate guide groove 104 formed horizontally on the ejection plate guide member 105 fixed to the base 81. Accordingly, the ejection plate 162 is movable only horizontally.

When the cartridge 1 is at the recording/reproducing position as shown in FIG. 16A, the first guide pin 113 fits in the first guide groove E portion 135, the second guide pin 114 fits in the second guide groove C portion 143, and the third guide pin 115 fits in the third guide groove E portion 155, respectively. The upward movement of the cartridge holder 160 is therefore blocked by the top surfaces of the groove portions 135, 143, and 155. At this time, the cartridge 1 is properly positioned while being held by the cartridge holder 160.

When the cartridge 1 is at the unloading position as shown in FIG. 16C, the first guide pin 113 fits in the first guide groove A portion 131, the second guide pin 114 fits in the second guide groove A portion 141, and the third guide pin 115 fits in the third guide groove A portion 151, respectively. The downward movement of the cartridge holder 160 is therefore blocked by the bottom surfaces of the groove portions 131, 141, and 151. At this time, the clearance of 0.5 mm is secured between the top surface of the side 0 head 10 and the bottom surface of the cartridge 1.

As shown in FIG. 15, when the cartridge 1 is ejected from the apparatus, i.e., when the user pushes the ejection button 64 disposed on the front side of the ejection plate 162, the ejection plate 162 is driven toward the interior of the apparatus for a predetermined distance. At this time, the lock claw 66 which has been in contact with the end face of the ejection plate 162 due to the urging force of a torsion spring 192 is rotated counterclockwise, to fit in a groove (not shown) formed on the ejection plate 162. The ejection plate 162 is retained at this position by the lock claw 66 against the urging force of the extension spring 65 disposed between the ejection plate 162 and the base 81.

When the cartridge 1 is inserted into a predetermined position of the apparatus, the distal end face of the cartridge 1 abuts against an abutment pin 194. This causes the lock claw 66 to rotate clockwise together with the abutment pin 194, thereby releasing the engagement of the lock claw 66 with the ejection plate 162. As a result, the ejection plate 162 is driven toward the insertion opening by the urging force of the extension spring 65.

Thus, the cartridge loading mechanism of this example includes the cartridge holder 160, the guide pins 113, 114, and 115, the ejection plate 162, the ejection plate guide pins 101 and 102, the ejection plate guide member 105, the ejection button 64, end the extension spring 65.

The operation of the apparatus of this example will be described.

The positions of the components of the apparatus during the recording/reproducing operation are as follows:

As shown in FIG. 13, the side 0 arm 120 and the side 1 arm 121 are coupled together. They are positioned on a desired track between the innermost recording position and the outermost recording position of the recording medium 2 by the stepping motor 31. Then, data is recorded on/reproduced from the recording medium 2. During this operation, the ejection plate 162 is retained at a position close to the insertion opening by the urging force of the extension spring 65 as shown in FIG. 16A. The guide pins 113, 114, and 115 of the cartridge holder 160 fit in the first guide groove E portion 135, the second guide groove C portion 143, and the third guide groove E portion 155, respectively. The cartridge 1 is properly positioned while being held by the cartridge holder 160.

The retreat rack 92 engages with the final-stage gear 98 and is retained at a position closer to the insertion opening which is sufficiently away from the extrusion 122 of the side 1 arm 121 even when the side 1 head 11 is moved to the innermost recording position.

Then, the unloading operation will be described.

When the user pushes the ejection button 64 under the state shown in FIGS. 13 and 16A, the ejection plate 162 is driven toward the interior of the apparatus against the urging force of the extension spring 65. This causes the first guide pin 113 and the third guide pin 115 of the cartridge holder 160 to be moved upward to fit in the first guide groove D portion 134 and the third guide groove D portion 154 which are both the inclined grooves, respectively. At this time, the second guide pin 114 keeps fitting in the second guide groove C portion 143, and any upward movement is blocked by the top surface of the portion 143. As a result, only the portion of the cartridge holder 160 closer to the insertion opening is lifted. As the ejection plate 162 further moves toward the interior of the apparatus, the first guide pin 113 and the third guide pin 115 come to fit in the first guide groove C portion 133 and the third guide groove C portion 153 which are horizontal grooves, respectively. The second guide pin 114 still keeps the fitting in the second guide groove C portion 143. The first guide groove C portion 133 is located higher than the third guide groove C portion 153, and the second guide groove C portion 143 is located lowest. Therefore, the cartridge holder 160 is inclined downward toward the interior of the apparatus and also inclined downward leftward at an angle determined by the relative positions of the first guide pin 113 and the third guide pin 115. The cartridge 1 held by the cartridge holder 160 is also inclined downward toward the interior of the apparatus at substantially the same angle.

When the ejection plate 162 is driven toward the interior of the apparatus as described above, the train of gears 94 which engage with the driving rack 166 rotates, causing the retreat rack 92 engaging with the final-stage gear 98 to move toward the interior of the apparatus. When the top end of the retreat rack 92 abuts against the extrusion 122 of the side 1 arm 121, the unloading of the side 1 head 11 starts. As the retreat rack 92 is further driven, it presses the side 1 arm 121 toward the interior of the apparatus, releasing the coupling of the side 1 arm 121 and the side 0 arm 120. When the side 1 arm 121 reaches a position outside the outermost recording position by a distance corresponding to two tracks, the beam 23 extending from the side 1 arm 121 comes into contact with the retreat cam 41. While still being pressed by the retreat rack 92, the side 1 arm 121 is lifted along the inclined surface of the retreat cam 41, so that the clearance of 0.5 mm can be secured from the rim of the head window 3, and simultaneously the side 1 arm 121 is moved toward the interior of the apparatus, in order to reach a position shown in FIG. 14. The pressure spring 99 is pressed by the side 1 arm 121 toward the interior of the apparatus as shown in FIG. 14.

Then, the side 1 arm 121 rides over the horizontal surface of the retreat cam 41 and retained at this position, where the side 1 arm 121 is completely outside the cartridge 1. During the above unloading of the head, the cartridge 1 is kept inclined as described above.

When the ejection plate 162 is further driven, the guide pins 113, 114, and 115 come to fit in the first guide groove B portion 132, the second guide groove B portion 142, and the third guide groove B portion 152 which are all inclined grooves, respectively, causing the cartridge holder 160 to be lifted.

When the ejection plate 162 is finally driven to the position shown in FIG. 16C, The guide pins 113, 114, and 115 fit in the first guide groove A portion 131, the second guide groove A portion 141, and the third guide groove A portion 151, respectively. At this stage, the cartridge holder 160 becomes horizontal and stops lifting. The ejection plate 162 now engages with the lock claw 66 and is retained. The cartridge holder 160 and the cartridge 1 are then retained at this position, providing the clearance of 0.5 mm between the bottom surface of the cartridge 1 and the top surface of the side 0 head 10. The unloading of the cartridge is thus completed.

During the above operation, the side 1 arm 121 moves along the horizontal surface of the side 1 arm retreat cam 41 toward the interior of the apparatus and is retained at the position shown in FIGS. 15 and 16C under the pressure of the retreat rack 92 and against the urging force of the pressure spring 99. The unloading of the side 1 head 11 is thus completed.

Then, the loading operation will be described.

When the user inserts the cartridge 1 into the apparatus under the state shown in FIGS. 15 end 16C, the distal end face of the cartridge 1 abuts against the abutment pin 194. This causes the abutment pin 194 to rotate together with the lock claw 66, disengaging the ejection plate 162 from the lock claw 66. The ejection plate 162 is then driven back toward the insertion opening by the urging force of the extension spring 65. As a result, the first guide pin 113, the second guide pin 114, and the third guide pin 115 move to fit in the first guide groove B portion 132, the second guide groove B portion 142, and the third guide groove B portion 152, respectively. The cartridge holder 160 and the cartridge 1 start lowering. Then, the guide pins 113, 114, and 115 further move to fit in the first guide groove C portion 133, the second guide groove C portion 143, and the third guide groove C portion 133, respectively. At this moment, the cartridge holder 160 is inclined again, downward toward the interior of the apparatus.

Simultaneously with the above operation, the retreat rack 92 starts moving toward the insertion opening. With this movement, the side 1 arm 121 moves along the horizontal surface of the retreat cam 41 toward the insertion opening, while the extension 122 keeps the contact with the top end of the retreat rack 92 by the urging force of the pressure spring 99, to reach the position shown in FIG. 16B. Then, while still keeping contact with the retreat rack 92 by the urging force of the pressure spring 99, the side 1 arm 121 slides downward along the inclined surface of the retreat cam 41. The side 1 arm 121 further moves toward the insertion Opening keeping the clearance of 0.5 mm or more from the highest portion of the cartridge 1. Simultaneously with the disengagement of the beam 23 from the retreat cam 41, the pressure spring 99 abuts against a pressure spring stopper 150 and stops applying the urging force to the side 1 arm 121. Accordingly, the side 1 arm 121 releases the contact with the retreat rack 92. The inclination of the cartridge 1 is maintained during the above operation.

When the ejection plate 162 is further driven back toward the insertion opening, the first guide pin 113 and the third guide pin 115 moves downward along the first guide groove D portion 134 and the third guide groove D portion 154, respectively. At this time, since the second guide pin 114 moves along the horizontal second guide groove C portion 143, only the portion of the cartridge holder 160 closer to the insertion opening lowers. When the ejection plate 162 is driven closest to the insertion opening as shown in FIG. 16A, the guide pins 113, 114, and 115 fit in the first guide groove E portion 135, the second guide groove C portion 143, and the third guide groove E portion 155, respectively. Now the cartridge holder 160 is horizontal, and the cartridge 1 is held by the cartridge holder 160. The loading of the cartridge 1 is thus completed.

Simultaneously with the above operation, the retreat rack 92 is driven back toward the insertion opening in association with the movement of the ejection plate 162, until it reaches the position where it does not contact with the extrusion 122 even when the side 1 head 11 is moved to the innermost recording position, and is retained at this position.

The side 1 arm 121 is halted when it receives no urging force of the pressure spring 99. When the recording/reproducing operation is started, however, the side 0 arm 120 is moved toward the periphery of the cartridge 1 by the stepping motor 31 and abuts against the side 1 arm 121 which is halted near the outermost recording position. The two arms 120 and 121 are then coupled through the coupling magnet 22, as shown in FIG. 13, and thereafter they are moved together. The loading of the side 1 head 11 is thus completed. After calibration at the outermost recording position, the apparatus is ready for the recording/reproducing operation.

Referring to FIGS. 18A to 18D, the correlation between the head loading mechanism and the cartridge loading mechanism at the mounting/removal of the cartridge 1 will be described.

Figure 18B:
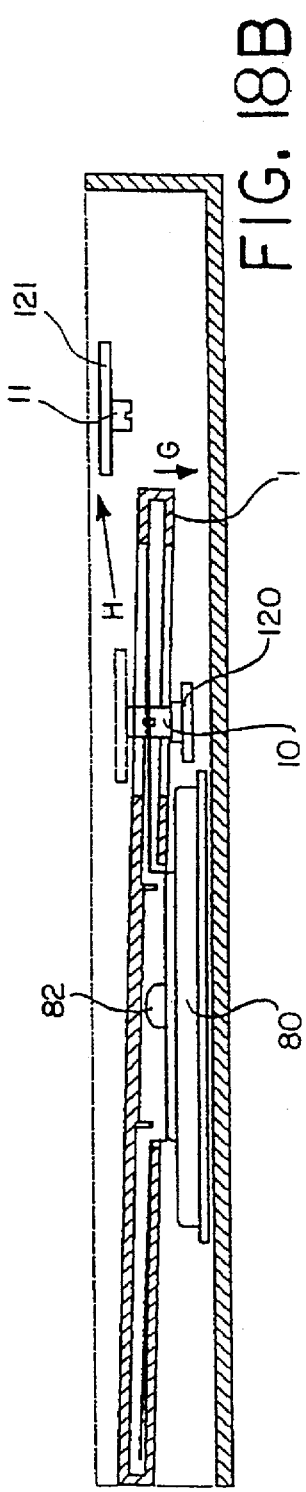
Figure 18C:
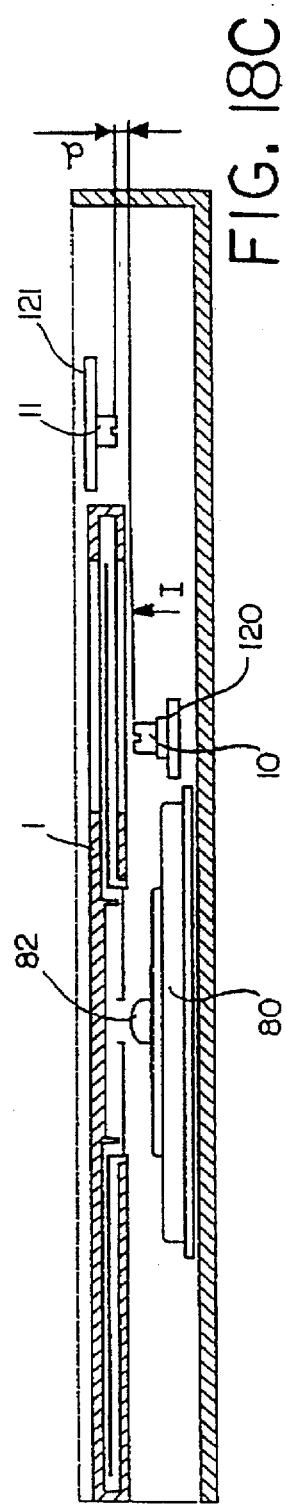
Figure 18D:
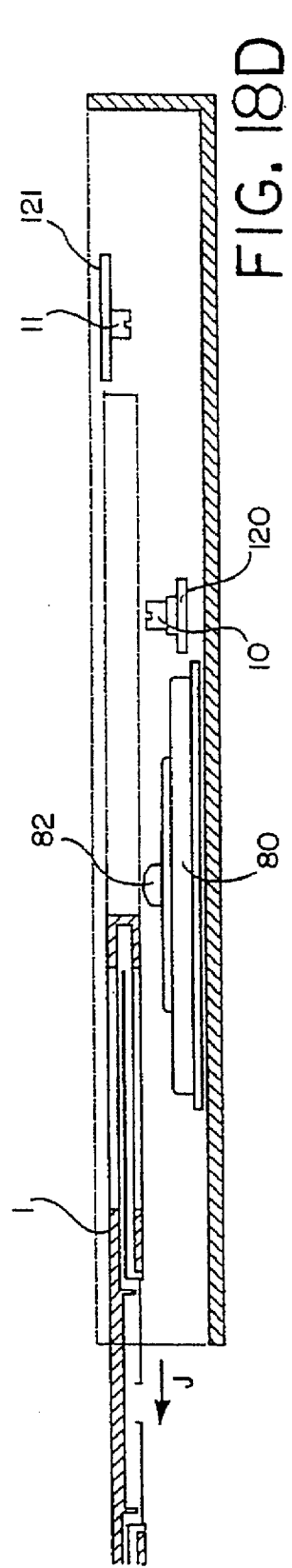

First, the removal of the cartridge 1 will be described. FIG. 18A shows the positions of the components during the recording/reproducing operation. Then, as shown in FIG. 18B, when the recording/reproducing operation is finished, the cartridge 1 is inclined downward toward the interior of the apparatus as shown by arrow G by the operation of the cartridge loading mechanism described above. Thereafter, the side 1 head 11 is moved in the direction shown by arrow H by the operation of the head loading mechanism and retained at its unloading position. Under this state, when the user pushes the ejection button 64, the cartridge 1 is lifted in the direction shown by arrow I, as shown in FIG. 18C, by the operation of the cartridge loading mechanism, and retained at its unloading position. At this stage, the cartridge 1 is ready for the ejection from the apparatus, and as shown in FIG. 18D, the cartridge 1 is ejected in the direction shown by arrow J. The cartridge ejection operation is thus completed.

The mounting of the cartridge 1 can be conducted by reversing the above steps shown in FIGS. 18A to 18D, i.e., starting from the step shown in FIG. 18D. Then, the cartridge 1 is placed on the recording/reproducing position.

In this example, the first guide groove 130, the second guide groove 140, and the third guide groove 150 formed on the side walls of the ejection plate 162 for positioning the cartridge 1 have different shapes from one another. The cartridge 1 is therefore inclined downward toward the interior of the apparatus during the loading/unloading of the side 1 head 11, lowering the height of the rim of the head window 3 during the loading/unloading of the side 1 head 11 compared with during the recording/reproducing operation. As a result, the lift of the side 1 head 11 can be reduced, and therefore the apparatus of this example can be thinner than that of Example 1 by the equivalent of the inclination of the cartridge 1.

For example, as in Example 1, assume that the "90 mm flexible disk cartridge" standardized by JIS is used as the cartridge 1, and that the thickness of the cartridge 1 is 315 mm, the length thereof is 94 mm, the thickness of the side 1 head 11 is 2.1 mm, and the inclination angle of the cartridge 1 is 1.6°. Then, the portion of the rim of the head window 3 closer to the interior of the apparatus can be lowered by approximately 1 mm when the cartridge 1 is inclined. Accordingly, the vertical displacement d of the side 1 head 11 shown in FIG. 18C and thus the thickness of the apparatus can be reduced by approximately 1 mm, compared with the apparatus of Example 1.

Further, according to this example, the head loading mechanism and the cartridge loading mechanism operate in association with each other by driving the ejection plate 162. Therefore, the loading/unloading of both the heads 10 and 11 and the cartridge 1 can be conducted by using one driving source, for example by only the user's operation and not using an actuator as in this example. This makes it possible to conduct the mounting/removal of the cartridge 1 to/from the apparatus even when power supply is discontinued due to breakdown or other troubles. This example can also be achieved by automatic loading with an actuator exclusively used for the loading/unloading operation. For example, the loading/unloading operation can be conducted in the manner as described above by using an automatic loading mechanism disclosed in Japanese Patent Publication No. 4-66066, as well as a mechanism composed of a worm, a rack, a gear, and the like using a motor as a driving source, to drive the ejection plate.

Furthermore, according to this example, the ejection plate 162 for positioning the cartridge 1 during the loading/ unloading operation is coupled with the retreat rack 92 for positioning the side 1 head 11 during the loading/unloading operation through the train of gears 94. Accordingly, the positions of the cartridge 1 and the side 1 head 11 during the loading/unloading operation are determined by the position of the ejection plate 162. Accordingly, the cartridge 1 and the side 1 head 11 can be located at desired positions relative to each other in response to the position of the ejection plate 162. As a result, such positions will not be deviated relative to each other regardless of any variation in the force and speed of the user's operation. In other words, the cartridge 1 and the side 1 head 11 are prevented from hitting against each other during the loading/unloading operation. Moreover, the ejection plate 162, the gears constituting the train of gears 94, and the retreat rack 92 are all made of thin plate, so that the thickness of the apparatus can be further reduced.

EXAMPLE 4

A fourth example of the information recording/ reproducing apparatus according to the present invention will be described with reference to FIGS. 19 and 20.

In the previous examples, during the unloading operation, only the side 1 head 11 is moved outside the periphery of the cartridge 1 placed at the recording/reproducing position. In this example, both the side 0 head 10 end the side 1 head 11 are moved outside the periphery of the cartridge 1.

First, the head loading mechanism of this example will be described.

Figure 19:
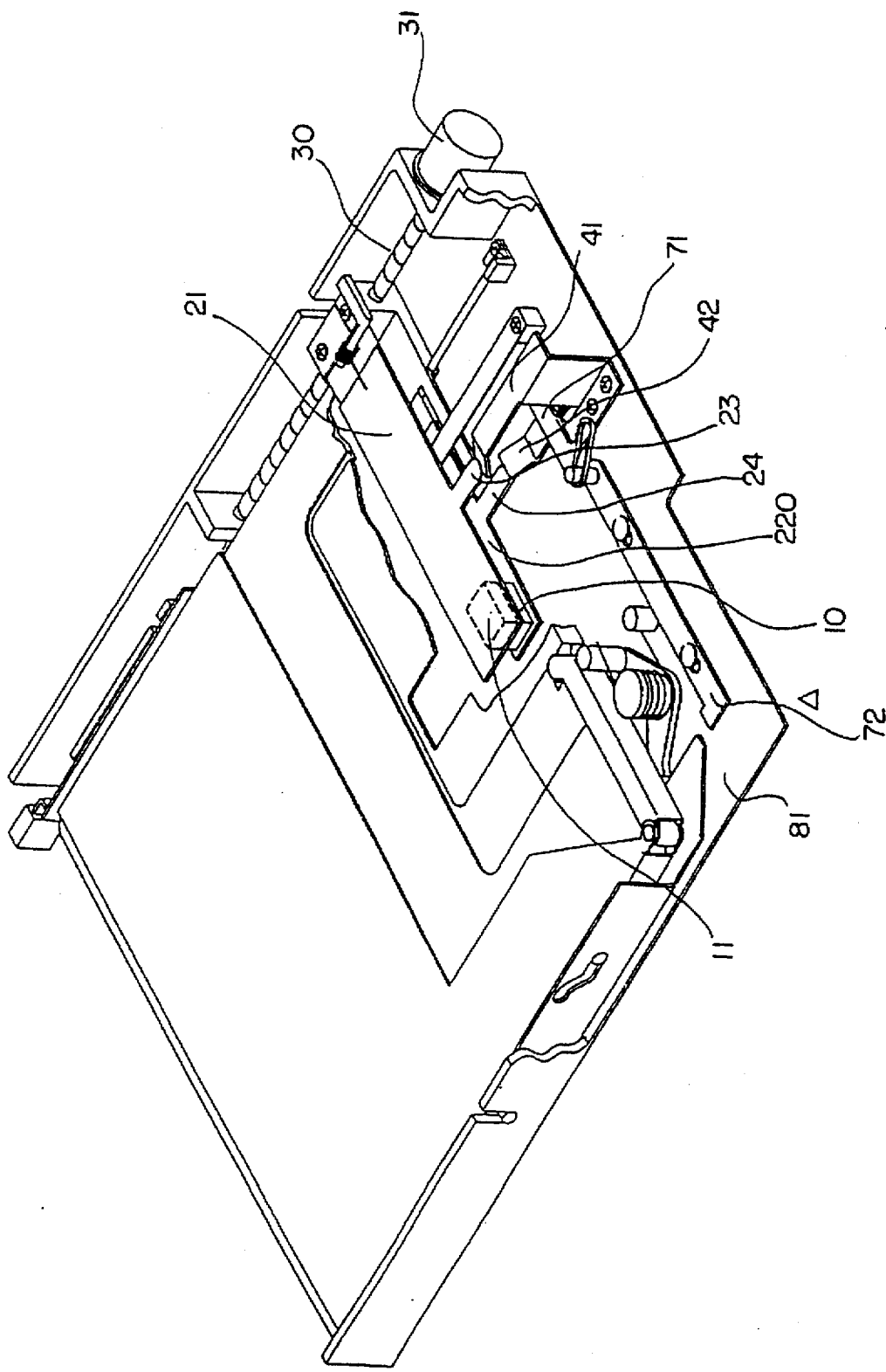
FIG. 19 is a perspective view of a fourth example of the information recording/reproducing apparatus according to the present invention, showing the positions during the recording/reproducing operation.

As shown in FIG. 19, an side 0 arm 220 has the side 0 head 10 fixed to one end, and is coupled with the side 1 arm 21 at the other end. The side 0 arm 220 and the side 1 head 21 are moved together by the stepping motor 31, so that the side 0 head 10 and the side 1 head 11 can be positioned on a selected point between the innermost recording position of the recording medium 2 and their respective unloading positions shown in FIG. 20. In this example, the unloading position of the side 0 head 10 is also located outside the periphery of the cartridge 1, so that no contact is allowed between the cartridge 1 and the side 0 head 10 during the loading/unloading operation. The apparatus has a retreat cam 42 for the side 0 arm 220 integrally formed with the retreat cam 41 for the side 1 arm 21 so that the two side 0 arm retreat cam 41 and 42 are vertically symmetrical, and fixed to the base 81. As is the case for the side 1 arm 21, a beam 24 extrudes from the side 0 arm 220 so as to engage with the side 0 arm retreat cam 42. The beam 24 engages with the side 0 arm retreat cam 42 when the side 0 head 10 is moved outside the outermost recording position by a distance corresponding to two tracks, and thereafter the side 0 head 10 is further moved and lifted so that the clearance of 0.5 mm is secured between the top surface of the side 0 head 10 and the bottom surface of the cartridge 1.

The side 0 arm 220, the side 1 arm 21, the lead screw 30, the stepping motor 31, the guide rod 32, and the retreat cams 41 and 42 constitute the head loading mechanism of this example.

The cartridge loading mechanism and the ejection lock mechanism are the same as those of Example 1.

The operation of this example will be described with reference to FIGS. 19 and 20.

First, the loading/unloading of the heads 10 and 11, the loading/unloading of the cartridge 1, and the operation of the ejection lock mechanism will be separately described. Then, the correlation among these operations when the cartridge 1 is mounted/removed will be described.

The loading/unloading of the heads 10 and 11 in this example is conducted in synchronization with ON/OFF signals supplied to the spindle motor 80, as in Example 1. During the recording/reproducing operation, the above-described components of the apparatus are located as shown in FIG. 19.

When the recording/reproducing operation is finished, the spindle motor 80 receives a motor OFF signal from a host computer and terminates the rotation. At the same time, the side 0 head 10 and the side 1 head 11 are moved to their respective unloading positions by the rotation of the stepping motor 31 and retained at the unloading positions. The unloading of the heads 10 and 11 is thus completed.

The side 0 arm 220 abuts against the end of the lock lever 71 when it reaches a position outside the outermost recording position by a distance corresponding to two tracks. The lock lever 71 then rotates clockwise. This causes the ejection lock mechanism to release the blocking against the translation of the ejection plate 62 toward the interior of the apparatus when the side 1 head 11 reaches its unloading position.

At the start of the recording/reproducing, the spindle motor 80 starts rotating Upon receipt of a motor ON signal from the host computer. At the same time, the stepping motor 31 starts rotating, allowing the side 0 head 10 and the side 1 head 11 to move from their respective unloading positions to the outermost recording position. They are then retained at the positions. The loading of the heads 10 and 11 is thus completed.

The unloading of the cartridge 1 is the same as that in Example 1. When the user pushes the ejection button 64 under the state where the cartridge 1 is placed at the recording/reproducing position, the cartridge 1 is lifted to its unloading position and retained at that position. Once the unloading of the cartridge 1 is completed, a predetermined clearance is secured between the top end of the spindle shaft 82 and the bottom surface of the cartridge 1, allowing the smooth ejection of the cartridge 1.

When the side 0 head 10 and the side 1 head 11 are placed at the recording/reproducing position, the ejection lock mechanism blocks the translation of the ejection plate 62, preventing the cartridge 1 from being unloaded, as in Example 1. The loading of the cartridge 1 is the same as that of Example 1.

Referring to FIGS. 20A to 20C, the correlation between the head loading mechanism and the cartridge loading mechanism will be described.

As shown in FIG. 20A, when the recording/reproducing operation is finished, the side 0 head 10 and the side 1 head 11 are moved in directions shown by arrows K and L, respectively, and then retained at the respective unloading positions. Then, as shown in FIG. 20B, when the user pushes the injection button 64, the cartridge 1 is moved in the direction shown by arrow M by the cartridge loading mechanism and retained at its unloading position. At this stage, the cartridge 1 is ready for ejection, and as shown in FIG. 20C, it is ejected in the direction shown by arrow N. The ejection of the cartridge 1 is thus completed.

The cartridge 1 can be loaded by reversing the above ejection steps shown in FIGS. 5A to 5C, i.e., starting from the step shown in FIG. 5C. Then, the cartridge 1 is placed on the recording/reproducing position.

According to this example, as shown in FIG. 20A, a vertical displacement d1 of the side 1 head 11 is 2.2 mm which is the total of the thickness s1 of a portion of the side 1 head 11 inserted into the cartridge 1 during the recording/reproducing operation (1.7 mm) and a clearance c1 required for the reliability of the operation (0.5 mm). This means that the vertical displacement d1 is reduced by 2.3 mm compared with that of the conventional apparatus. Thus, the thickness of the apparatus can be reduced by 2.3 mm, i.e., by the equivalent of the thickness of one head.

A vertical displacement d0 of the side 0 head 10 is 2.3 mm which is the total of the thickness s0 of a portion of the side 0 head 10 inserted into the cartridge 1 during the recording/reproducing operation (1.8 mm) and a clearance c0 required for the reliability of the operation (0.5 mm).

In this example, as in the conventional example, when the thickness of the portion from the bottom surface of the apparatus to the top end of the rotor of the spindle motor 80 is 2.8 mm, and the clearance between the top end of the rotor and the bottom surface of the cartridge is 0.7 mm, the thickness of the portion from the bottom surface of the apparatus to the bottom surface of the cartridge 1 is 3.5 mm. Also, when the thickness of a portion of the side 0 head 10 inserted into the cartridge 1 is 1.8 mm, the clearance between the top surface of the side 0 arm 220 and the bottom surface of the cartridge 1 is 0.3 mm. When the thickness of the side 0 arm 220 is 0.5 mm, the distance between the bottom surface of the side 0 arm 220 at the recording/reproducing position and the bottom surface of the apparatus is 2.7 mm which is obtained by subtracting the clearance 0.3 mm between the top surface of the side 0 arm 220 and the bottom surface of the cartridge 1 and the thickness 0.5 mm of the side 0 arm 220 from the thickness 3.5 mm of the portion between the bottom surface of the cartridge 1 and the bottom surface of the apparatus. That is, the space between the bottom surface of the side 0 arm 220 and the bottom surface of the apparatus is greater than the vertical displacement 2.3 mm of the side 0 head 10 from the recording/reproducing position. Accordingly, in this example, it is possible to move the side 0 arm 120 downward from the recording/reproducing position and then outside the periphery of the cartridge 1 by using the same components at the same arrangement in the portion of the apparatus below the cartridge 1 as those in the conventional example.

Thus, the side 0 head 10 can also be moved outside the periphery of the cartridge 1 as well as the side 1 head 11 without increasing the thickness of the portion of the apparatus below the cartridge 1. Accordingly, the total thickness of the apparatus can be reduced by 2.3 mm which is the vertical displacement of the side 1 head 11, i.e., the equivalent of the thickness of one head, compared with the conventional apparatus as in Example 1.

Another advantage of this example is that the side 0 arm 220 and the side 1 arm 21 can always be moved together during the loading/unloading operation as well as during the recording/reproducing operation without the necessity of coupling with and separating from each other. This eliminates the possibility of lowering the precision at positioning the heads during the recording/reproducing operation. Further, since the coupling magnet 22 and the side 0 arm stopper 40 can be omitted, the number of components is reduced.

One trouble relating to this example is that, if the thickness of the spindle motor 80 is reduced by 0.5 mm, for example, the thickness of the portion of the apparatus below the cartridge 1 needs to be increased so as to secure the space for the downward displacement of the side 0 head 10. Therefore, in order to most reliably reduce the thickness, it is best to move only the side 1 head 11 to the retreat position as in Example 1.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording/reproducing apparatus removably holding a disk cartridge including a case having a head window and a recording medium stored in the case, the head window facing at least one surface of the recording medium, for recording/reproducing information on/from the at least one surface of the recording medium by inserting a side 0 head and a side 1 head into the disk cartridge through the head window and retaining the side 0 head and the side 1 head inside the disk cartridge, the apparatus comprising:

a rotation mechanism for rotating the recording medium on the center axis thereof;

a cartridge loading mechanism for transporting the disk cartridge from a cartridge unloading position in which the disk cartridge is not engaged with the rotation mechanism to a cartridge recording/reproducing position in which the disk cartridge is engaged with the rotation mechanism, to place the disk cartridge at the cartridge recording/reproducing position when the disk cartridge is mounted, and for transporting the disk cartridge from the cartridge recording/reproducing position to the cartridge unloading position to place the disk cartridge at the cartridge unloading position when the disk cartridge is removed; and a head loading mechanism operatively connected to the cartridge loading mechanism for transporting the side 0 head and the side 1 head from a head unloading position to a head recording/reproducing position to place the side 0 head and the side 1 head at the head recording/reproducing position immediately adjacent the recording medium via the head window after the disk cartridge has been placed at the cartridge recording/reproducing position when the disk cartridge is mounted, and for transporting the side 0 head and the side 1 head from the head recording/reproducing position to the head unloading position to place the side 0 head and the side 1 head at the head unloading position located away from the recording medium before the disk cartridge is transported from the cartridge recording/reproducing position to the cartridge unloading position when the disk cartridge is removed, wherein the head unloading position for the side 1 head is set outside the peripheral edge of the disk cartridge placed at the cartridge recording/reproducing position in a direction transverse the center axis, the head loading mechanism includes displacement means for allowing the side 1 head to override the rim of the head window when the head loading mechanism transports the side 1 head between the head recording/reproducing position and the head unloading position, the side 0 head is facing one surface of the recording medium, the side 1 head is facing another surface of the recording medium, the side 0 head and the side 1 head are coupled with each other by coupling means, and the head loading mechanism includes means for directly driving one of the side 0 head and the side 1 head and means for discontinuing the coupling between the side 0 head and the side 1 head by applying a force to the other of the side 0 head and the side 1 head at which point the other of the side 0 head and the side 1 head remains stationary as the one of the side 0 head and the side 1 head is driven to a location outside of the peripheral edge of the disk cartridge.

2. An information recording/reproducing apparatus according to claim 1, wherein the coupling means is a magnet.

3. An information recording/reproducing apparatus according to claim 1, wherein the displacement means has a member which exerts a force to displace the side 1 head to override the rim of the head window.

4. An information recording/reproducing apparatus according to claim 3, wherein the member of the displacement means is rotatably supported and rotates so as to extend from the head unloading position toward the head recording/reproducing position.

5. An information recording/reproducing apparatus according to claim 1, wherein the head loading mechanism includes an actuator for a head seek, the actuator positions the side 0 head and the side 1 head on desired tracks of the recording medium while the side 0 head or the side 1 head record/reproduce the information.

6. An information recording/reproducing apparatus according to claim 5, wherein the actuator includes a stepping motor, and the actuator positions the side 0 head and side 1 head by controlling an angle of rotation of the stepping motor.

* * * * *